(12) United States Patent
Hieda et al.

(10) Patent No.: US 6,538,696 B2
(45) Date of Patent: Mar. 25, 2003

(54) IMAGE SENSING APPARATUS USING A NON-INTERLACE OR PROGRESSIVE SCANNING TYPE IMAGE SENSING DEVICE

(75) Inventors: Teruo Hieda, Yokohama (JP); Kousuke Nobuoka, Kamakura (JP); Izumi Matsui, Kawasaki (JP); Yukinori Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,429

(22) Filed: Nov. 24, 1999

(65) Prior Publication Data

US 2002/0033887 A1 Mar. 21, 2002

Related U.S. Application Data

(62) Division of application No. 08/709,381, filed on Sep. 6, 1996, now Pat. No. 6,011,583.

(30) Foreign Application Priority Data

| Sep. 8, 1995 | (JP) | 7-231134 |
| Sep. 29, 1995 | (JP) | 7-253541 |
| Oct. 11, 1995 | (JP) | 7-263179 |
| Oct. 27, 1995 | (JP) | 7-280877 |

(51) Int. Cl.⁷ .......................... H04N 3/14; H04N 11/20
(52) U.S. Cl. ...................... 348/317; 348/446
(58) Field of Search ............... 348/220, 222, 348/230, 282, 283, 317, 321, 323, 324, 446, 448, 452, 458, 554, 555, 558

(56) References Cited

U.S. PATENT DOCUMENTS

| 4,714,963 A | 12/1987 | Vogel ........................... 348/322 |
| 4,719,644 A | 1/1988 | Herzog et al. ................ 378/99 |
| 4,750,057 A | 6/1988 | Baumeister .................. 348/376 |
| 5,264,939 A | 11/1993 | Chang ........................... 348/322 |
| 5,272,535 A | * 12/1993 | Eladb .......................... 348/317 |
| 5,424,774 A | * 6/1995 | Takayama et al. ............. 348/222 |
| 5,430,481 A | 7/1995 | Hynecek ...................... 348/322 |
| 5,440,343 A | 8/1995 | Parulski et al. .............. 348/322 |
| 5,475,525 A | 12/1995 | Przyborski et al. .......... 348/446 |
| 5,479,604 A | * 12/1995 | Tsubota ....................... 395/162 |
| 5,497,199 A | * 3/1996 | Asada et al. ................. 348/446 |
| 5,523,787 A | * 6/1996 | Fukuba ........................ 348/317 |

(List continued on next page.)

FOREIGN PATENT DOCUMENTS

| EP | 0 630 159 A1 | 2/1994 | |
| JP | 7298295 | 4/1994 | ............ H04N/9/79 |
| JP | 7-115623 | 2/1995 | |

OTHER PUBLICATIONS

European Search Report dated Dec. 23, 1999.
EPO Abstract for Japanese Patent No. 08009269, published Dec. 1, 1996.
Abstract for Japanese Patent No. 7–115623.

*Primary Examiner*—Wendy R. Garber
*Assistant Examiner*—Rashawn N. Tillery
(74) *Attorney, Agent, or Firm*—Morgan & Finnegan, LLP

(57) ABSTRACT

A CCD converts an optical image of an object formed on its image sensing surface into electrical charges, and sequentially outputs the electrical charges of all of the light receiving pixels in one scanning operation in non-interlaced form. The outputs from the CCD are converted to the digital image signals by an analog-digital converter. A camera signal processing unit processes the digital image signals, thereby generating two streams of signals; one is digital video signals SV1 which are standard digital video signals in interlaced form, and the other is signals SV2 which are not outputted as the digital video signals SV1 out of the digital image signals of all of the light receiving pixels. These two streams of signals, SV1 and SV2, are processed differently depending upon a mode selected by a switch.

8 Claims, 27 Drawing Sheets

U.S. PATENT DOCUMENTS

| | | | |
|---|---|---|---|
| 5,523,788 A | * 6/1996 | Kannegundla et al. | 348/321 |
| 5,563,661 A | * 10/1996 | Takahashi | 348/390 |
| 5,579,047 A | 11/1996 | Yamagami et al. | 348/322 |
| 5,625,741 A | 4/1997 | Nakazato | 386/120 |
| 5,663,759 A | 9/1997 | Horng et al. | 348/222 |
| 5,663,761 A | * 9/1997 | Fukui | 348/323 |
| 5,706,387 A | 1/1998 | Makishima | 348/220 |
| 6,011,583 A | * 1/2000 | Hieda et al. | 348/220 |
| 6,144,412 A | * 11/2000 | Hirano et al. | 348/448 |
| 6,166,777 A | * 12/2000 | Ock | 348/558 |

* cited by examiner

FIG. 2

| | 1 | 2 | 3 | 4 | 5 | 6 | 7 | 8 |
|---|---|---|---|---|---|---|---|---|
| | P00 | P10 | P20 | P30 | P40 | P50 | P60 | P70 |
| | P01 | P11 | P21 | P31 | P41 | P51 | P61 | P71 |
| | P02 | P12 | P22 | P32 | P42 | P52 | P62 | P72 |
| | P03 | P13 | P23 | P33 | P43 | P53 | P63 | P73 |
| | P04 | P14 | P24 | P34 | P44 | P54 | P64 | P74 |
| | P05 | P15 | P25 | P35 | P45 | P55 | P65 | P75 |
| | P06 | P16 | P26 | P36 | P46 | P56 | P66 | P76 |
| | P07 | P17 | P27 | P37 | P47 | P57 | P67 | P77 |

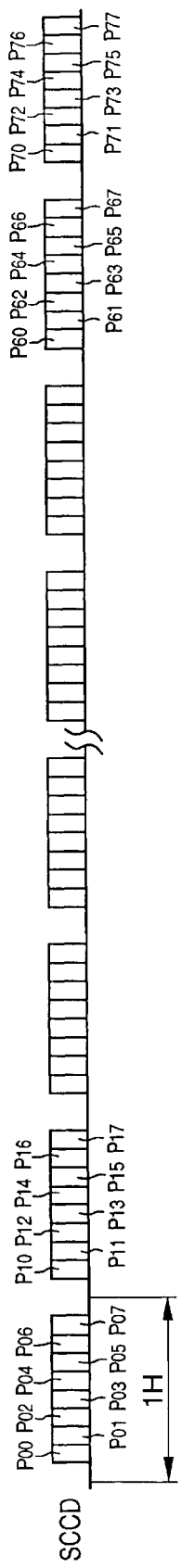
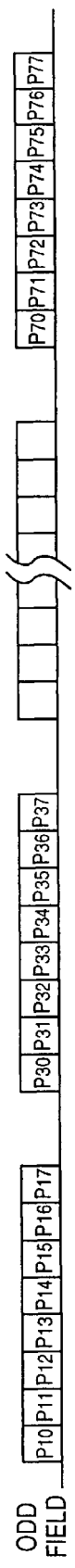
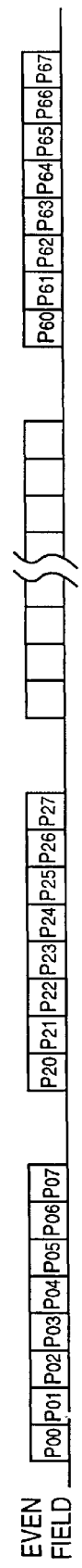
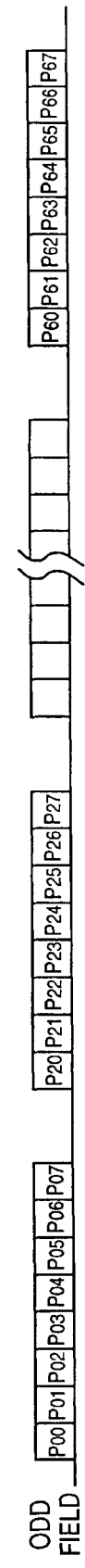
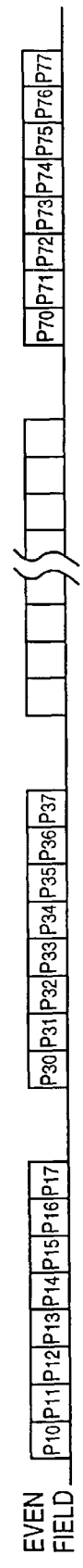

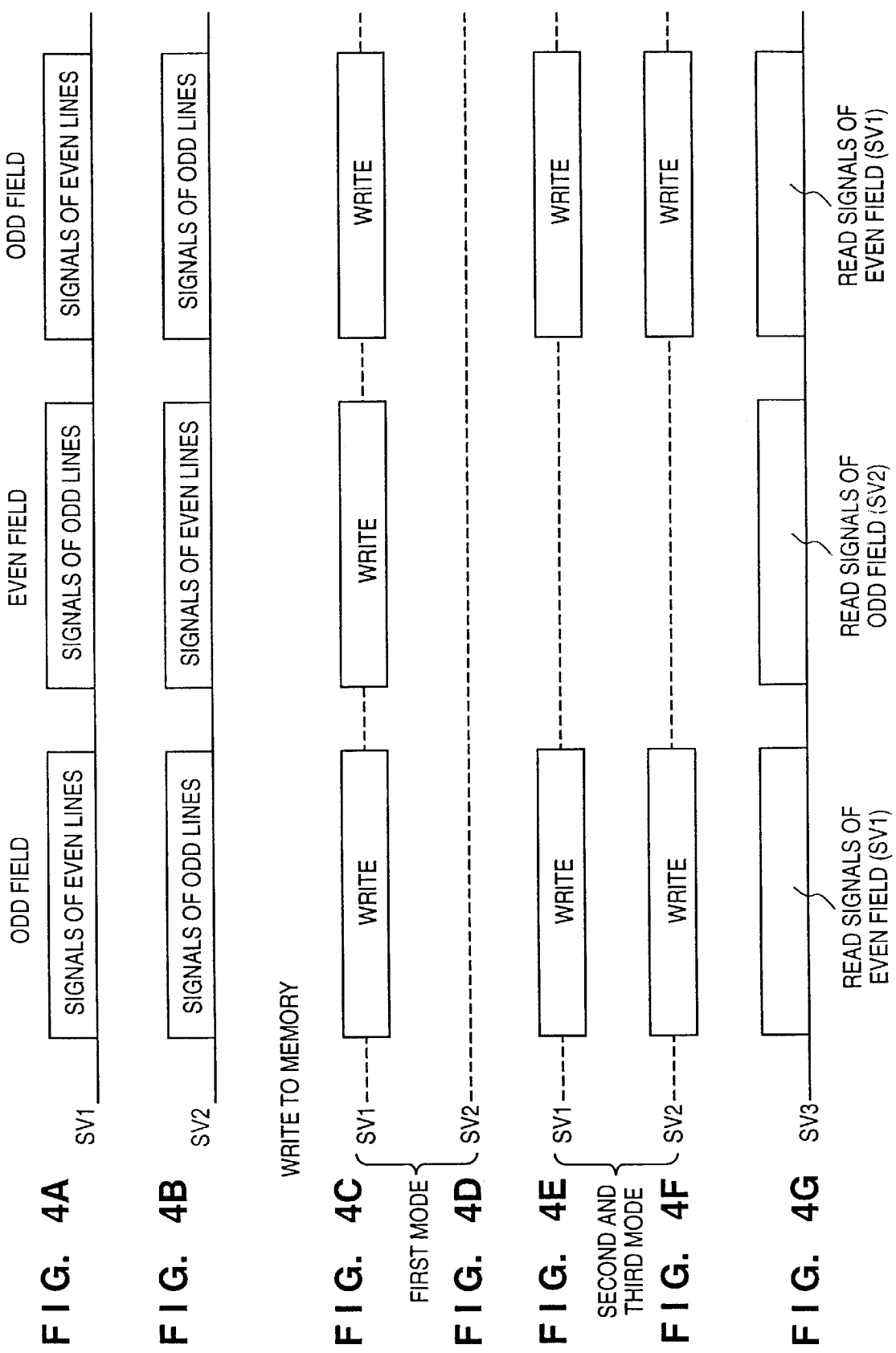

FIG. 5
PRIOR ART

|   | 1 | 2 | 3 | 4 | 5 | 6 | 7 | 8 |
|---|---|---|---|---|---|---|---|---|
|   | R | G | R | G | R | G | R | G |
|   | G | B | G | B | G | B | G | B |
|   | R | G | R | G | R | G | R | G |
|   | G | B | G | B | G | B | G | B |
|   | R | G | R | G | R | G | R | G |
|   | G | B | G | B | G | B | G | B |
|   | R | G | R | G | R | G | R | G |
|   | G | B | G | B | G | B | G | B |

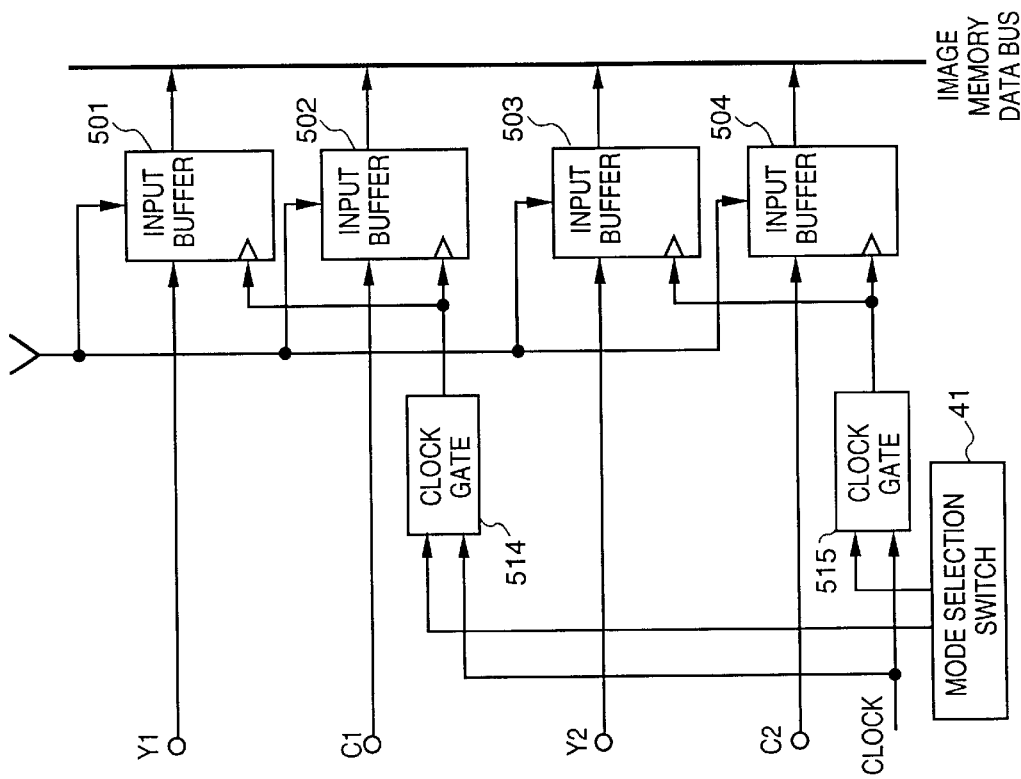
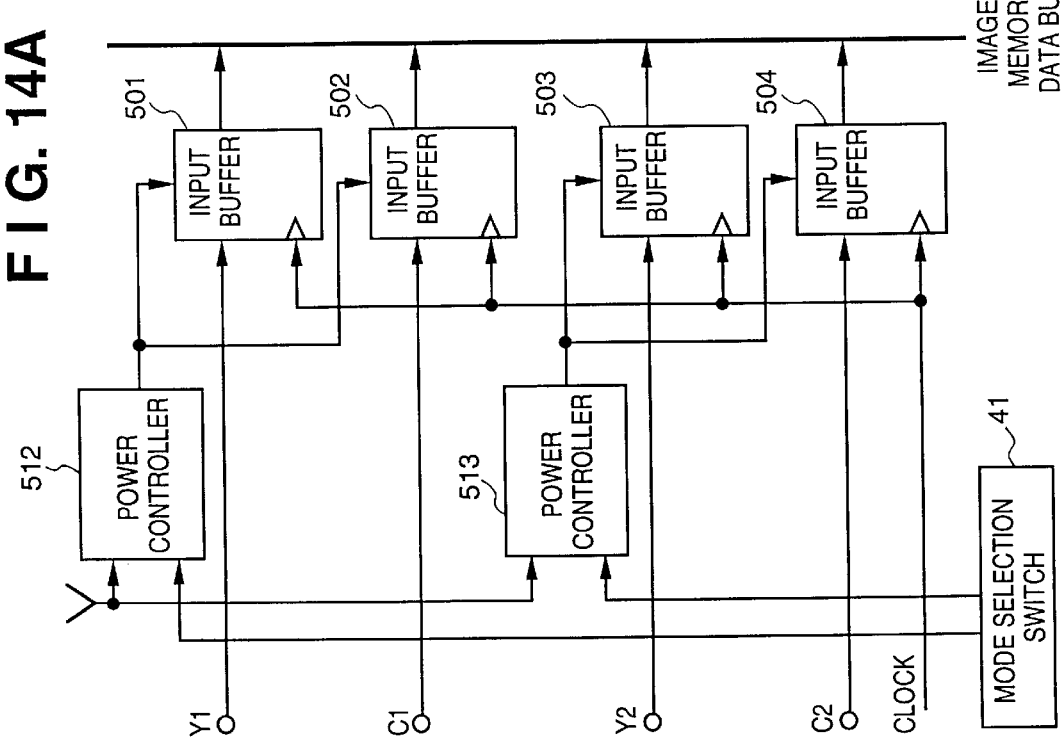

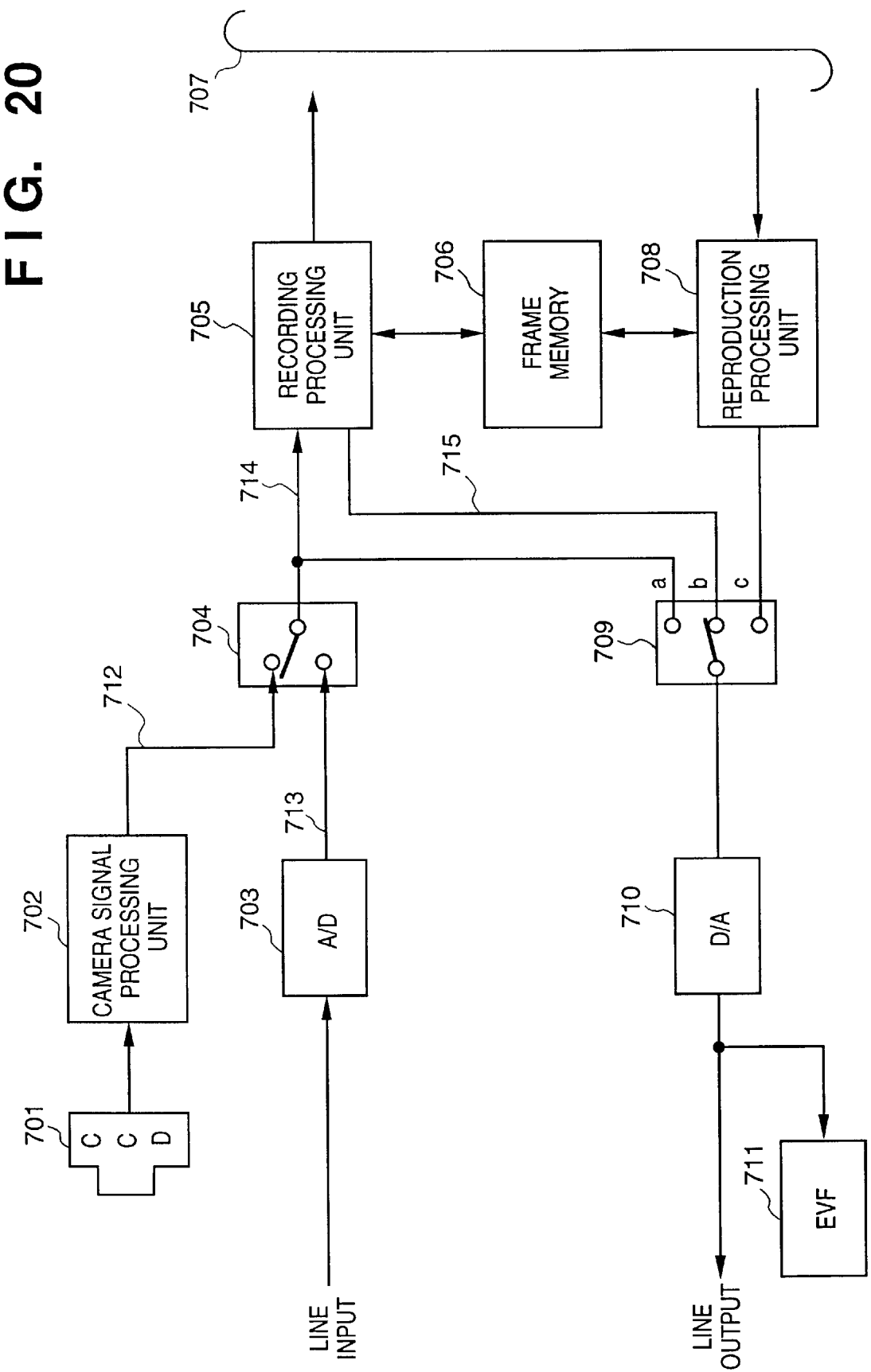

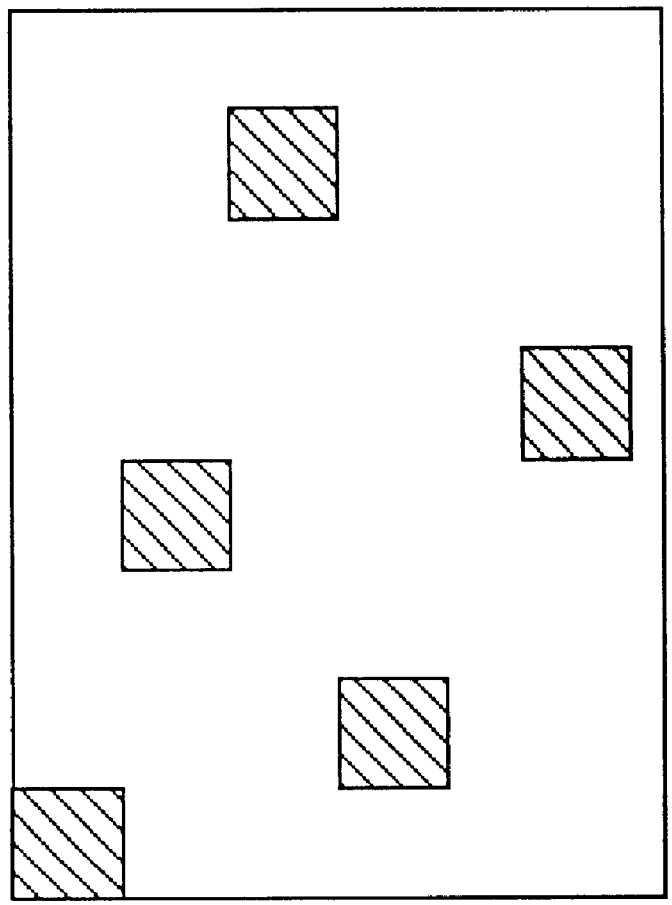

IMAGE SENSING APPARATUS USING A NON-INTERLACE OR PROGRESSIVE SCANNING TYPE IMAGE SENSING DEVICE

CROSS-REFERENCE TO RELATED APPLICATION

This application is a division of U.S. Application Ser. No. 08/709,381, filed Sep. 6, 1996, now U.S. Pat. No. 6,011,583.

BACKGROUND OF THE INVENTION

The present invention relates to an image sensing apparatus and, more particularly, to an image sensing apparatus which senses an image by using a non-interlace or progressive scanning type image sensing device.

As digital signal processing technique improves, many image sensing apparatuses, such as a video camera, having an image sensing unit and a digital recording and playing unit have been developed.

In those apparatuses, standard video signals are generated by an image sensing unit provided with an image sensing device, such as a CCD, compressed by discrete cosine transform (DCT) and quantization, then the compressed video signals are encoded in a format which is suitable for digital tape recording. Thereafter, the encoded signals are recorded on a tape by a recording head. Upon playing back the tape, errors of reproduced signals read by a real head are corrected, decoded and expanded in an opposite manner to the recording operation, then outputted as reproduced video signals.

An example of an image sensing apparatus is shown in FIG. 27.

In FIG. 27, reference numeral 1001 denotes a lens; 1002, a CCD as an interlace scanning type image sensing device for converting an optical image of an object into electrical signals; 1003, an A/D converter for converting analog signals into digital signals; 1004, a camera signal processing circuit for converting the digitized output of the CCD 1002 into video signals of a unit of field; 1005, a video signal processing circuit for compressing the video signals and transforming the compressed video signals to recording data in a format which is suitable for magnetic recording; 1006, a recording circuit for magnetically recording the recording data on a magnetic tape or the like; 1007, a CCD driver for controlling timing of driving the CCD 1002; 1008, an image memory for storing image data; and 1009, a memory address controller for controlling write/read addresses for writing/reading image data to/from the image memory 1008.

An optical image of the object which passed through the lens 1001 is converted into electrical signals of field, which is composed of odd lines or even lines, by the CCD 1002. The output from the CCD 1002 is converted into digital signals by the A/D converter 1003, then enters the camera signal processing circuit 1004. The camera signal processing circuit 1004 performs aperture correction, high luminance color knee correction, white balance correction, γ correction, matrix operation, addition of a synchronization signal, AF preprocessing, AE preprocessing, and so on. Then, it outputs luminance signals and time division multiplexed color difference signals of two kinds of color difference signals by interlaced field. These luminance signals and time division multiplexed color difference signals enter the video signal processing circuit 1005.

The video signal processing circuit 1005 generates frame image data from image data of two successive fields by using the image memory 1008 controlled by the memory address controller 1009, then divides the frame image data into image data of blocks. Thereafter, the image data of blocks is applied with shuffling process in which image data of blocks is read out in a order that is suitable for progressive coding, orthogonal transform, such as DCT, for transforming the read image data of blocks into orthogonal transform coefficients, quantization for quantizing the orthogonal transform coefficients of block depending upon skew of the orthogonal transform coefficients, such as DCT coefficients, to a low frequency range or to a high frequency range, thereby reducing the amount of data, and coding process for further reducing the amount of data by using Huffman coding, for example.

Further, de-shuffling process for de-shuffling the shuffled and quantized data of blocks is performed by using the image memory 1008 controlled by the memory address controller 1009. Thereby, the luminance signals and the color difference signals are transformed into coded data whose amount is compressed.

Furthermore, the video signal processing circuit 1005 converts the coded data into recording data in a form suitable for magnetic recording, and the recording data is inputted into the recording circuit 1006, then recorded on a magnetic medium.

Most of image sensing devices, such as a CCD, used in a general-use video camera as described above, are composed of a great many number of photoelectric converters (pixels) arranged in two dimensions and a mechanism for sequentially transferring electric charges generated in the photoelectric converters. Upon transferring the electric charges, electric charges generated in the photoelectric converters in every other horizontal line are read out. Therefore, image signals of a half of the pixels in the image sensing device are outputted as image signals of each field in order to improve time division resolution. As for an image sensing device whose surface is covered with a complementary color mosaic filter, electrical charges of pixels in two horizontal adjacent lines are added and read out upon transferring electric charges generated by the photoelectric converters, thereby improving time division resolution as well as sensitivity.

The image signals obtained from the image sensing device as described above are interlaced signals, and a conventional general-use image sensing apparatus applies color conversion, and the like, on the image signals from the image sensing device to generate video signals which agree to television standard, such as NTSC and PAL.

Meanwhile, there is a proposal to output image signals generated by a two dimensional image sensing device as a moving image to a television monitor of television standard, such as NTSC and PAL, as well as output the image signals to an information processing device, such as a computer and a printer, as a still image.

However, image signals which are generated in a conventional manner as described above do not have good vertical resolution since it is sacrificed for improving time division resolution. Therefore, the quality of an image of a field inferiors to the quality of an image inputted by a still image input device, such as a scanner. In a case of printing the image of a field by a video printer or using it as an input image in a computer, since horizontal resolution of the image is much different from vertical resolution of the image, each pixel of the image has a shorter width and a longer length, thereby the obtained image may be blurred and give an unnatural impression. Especially, when the image of a field is directly dealt with by a computer, since the computer deals with each pixel as a square dot, a resulted image will have a rectangular shape having longer sides. Therefore, an image of a field has to be processed, however, the processed image would be of inferior quality.

If an image of an even field and an image of a successive odd field are combined together to make a frame image in order to avoid the aforesaid problem, when an object is moving, the combined frame image would not be a still image of high quality since the object looks differently when sensing an image of the even field and when sensing an image of the odd field. Further, when image signals of a field are obtained by adding electric charges of pixels in two horizontal adjacent lines (pixel addition reading method), vertical resolution is also deteriorated. Accordingly, resolution of a frame image obtained by combining an image of an odd field and an image of a successive even field does not improve. Furthermore, when the combined image is printed by a video printer, the printed image looks unnatural since the resolution in the horizontal direction and that in the vertical direction quite differ from each other, which causes blurring of each pixel in the vertical direction.

In an image sensing apparatus using a conventional image sensing device which read out image signals by adding charges of pixels in two horizontal adjacent lines, as described above, it is difficult to generate video signals of various kinds of television standard and signals for a still image of high quality to be outputted from a still image output medium by using a single image sensing apparatus.

Furthermore, in a case where an image sensing device which reads all of the light receiving pixels by so-called non-interlace or progressive scanning is used, outputted image signals have a format different from that of standard television signals. Accordingly, there is a problem in which the output signals from the image sensing device can not be outputted on an electronic view finder (EVF) or a television monitor.

Further, a general video printer is designed so as not to accept non-standard television signals, therefore image signals outputted from the image sensing device which reads all of the light receiving pixels by non-interlace scanning can not be printed out directly.

SUMMARY OF THE INVENTION

The present invention has been made in consideration of above situation, and has as its object to provide an image sensing apparatus capable of obtaining a still image of high resolution by improving vertical resolution by using an image sensing device which is used for sensing both a moving image and a still image.

According to the present invention, the foregoing object is attained by providing an image sensing apparatus comprising: image sensing means for outputting data of all of light receiving pixels in a field period; first separation means for separating data of pixels on every other horizontal line out of the data of all of the light receiving pixels outputted by the image sensing means and generating first image data; second separation means for separating data of pixels on every other horizontal line which is not separated by the first separation means and generating second image data; selection means for selecting one of a plurality of modes which set different processes from each other to be performed on the first image data and the second image data; and storage means for storing the first image data and the second image data, wherein the first separation means separates data of every other horizontal line which is different from horizontal lines from which data are read in a previous field period.

The foregoing object is also attained by providing an image sensing apparatus comprising: image sensing means for outputting data of all of light receiving pixels in a field period; first output means for alternatively outputting data of pixels in two different fields out of the data of all of the light receiving pixels outputted from the image sensing means by a field period; and second output means for outputting the data of all of the light receiving pixels outputted from the image sensing means in every other field period.

The foregoing object is also attained by providing an image sensing apparatus comprising: image sensing means for outputting data of all of light receiving pixels in a field period; a color filter provided in front of the image sensing means; first output means for adding data of pixels, outputted from the image sensing means, on two horizontal adjacent lines whose combination in a field period is different from that in a previous field period and outputting the added data; and second output means for outputting the data of all of the light receiving pixels outputted from the image sensing means in every other field period.

According to the configuration as described above, when sensing a moving image, image signals of a frame, outputted from CCD, in every other line are used or image signals of pixels in two adjacent lines are added to make a field, and image signals of the next field are obtained by using image signals in every other line which has not been used in a previous frame in the former case or by adding image signals of pixels in different combination of two adjacent lines in the latter case. In the aforesaid manner, field images are generated and applied with predetermined processes sequentially. Further, the obtained image signals are processed and outputted as various kinds of television standard video signals. In a case of outputting the image signals as a still image, all the signals of a frame outputted by the non-interlace scanning type CCD are processed and outputted, thereby obtaining a still image of high quality using the vertical resolution of the non-interlace scanning type CCD direction at 100%.

It is another object of the present invention to provide an image sensing apparatus which avoids performing redundant signal processes when sensing a moving image by using an image sensing device which scans all of the light receiving pixels sequentially.

The foregoing object is attained by providing an image sensing apparatus comprising: image sensing means for outputting data of all of light receiving pixels in a field period; processing means for processing the data of all of the light receiving pixels outputted from the image sensing means; and control means for controlling the processing means so as to separate data of pixels on every other horizontal line out of the data of all of the light receiving pixels outputted by the image sensing means to generate moving image data.

According to the aforesaid configuration, since either image signals in the odd lines or image signals in the even lines are alternatively selected from successive different frame images to generate signals for a moving image, image signals in either even or odd lines which are not selected are not processed in vain, thereby saving energy.

It is still another object of the present invention to provide an image sensing apparatus capable of recording a still image of high quality without notches on outlines, as well as capable of dealing with obtained image signals in the same manner as general standard television signals.

According to the present invention, the foregoing object is attained by providing an image sensing apparatus comprising: image sensing means for outputting data of all of light receiving pixels by non-interlace scanning; storage means for storing the data of all of the light receiving pixels outputted from the image sensing means; and reading means for reading the data stored in the storage means in interlaced form.

With the configuration as described above, it is possible to sequentially write signals outputted by non-interlace scanning in a frame memory as well as read the stored signals in interlaced form and output to an external device. Accordingly, it is possible to effectively use all of the image data of a frame outputted by the non-interlace scanning type image sensing means, and to generate image signals, which can be displayed on an electronic view finder and a general-use television, of an image under recording or an image to be recorded.

According to an aspect of the present invention, one of the reading means and the recording processing means reads the data stored in the storage means.

With the aforesaid configuration, a reading unit is configured so as not to operate when recording an image, thus, the reading operation of reading image signals stored in the frame memory in the interlaced form is not performed during recording. Thereby, it is possible to record a still image as well as monitor a still image to be recorded without a high-speed memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an explanatory view showing an pixel arrangement of a CCD;

FIGS. 3A to 3E are timing charts representing an operation of the first embodiment;

FIGS. 4A to 4G are timing charts representing the operation of the first embodiment;

FIG. 5 is an explanatory view showing an arrangement of a mosaic color filter;

FIGS. 14A and 14B are block diagrams illustrating configurations of control circuits for controlling input buffers;

FIG. 20 is a block diagram illustrating a configuration of the image sensing apparatus according to the fifth embodiment;

FIG. 22 is an explanatory view for explaining shuffling;

DETAILED DESCRIPTION OF THE PREFERRED EMBODIMENTS

Preferred embodiments of the present invention will be described in detail in accordance with the accompanying drawings.

<First Embodiment>

Figure 1:
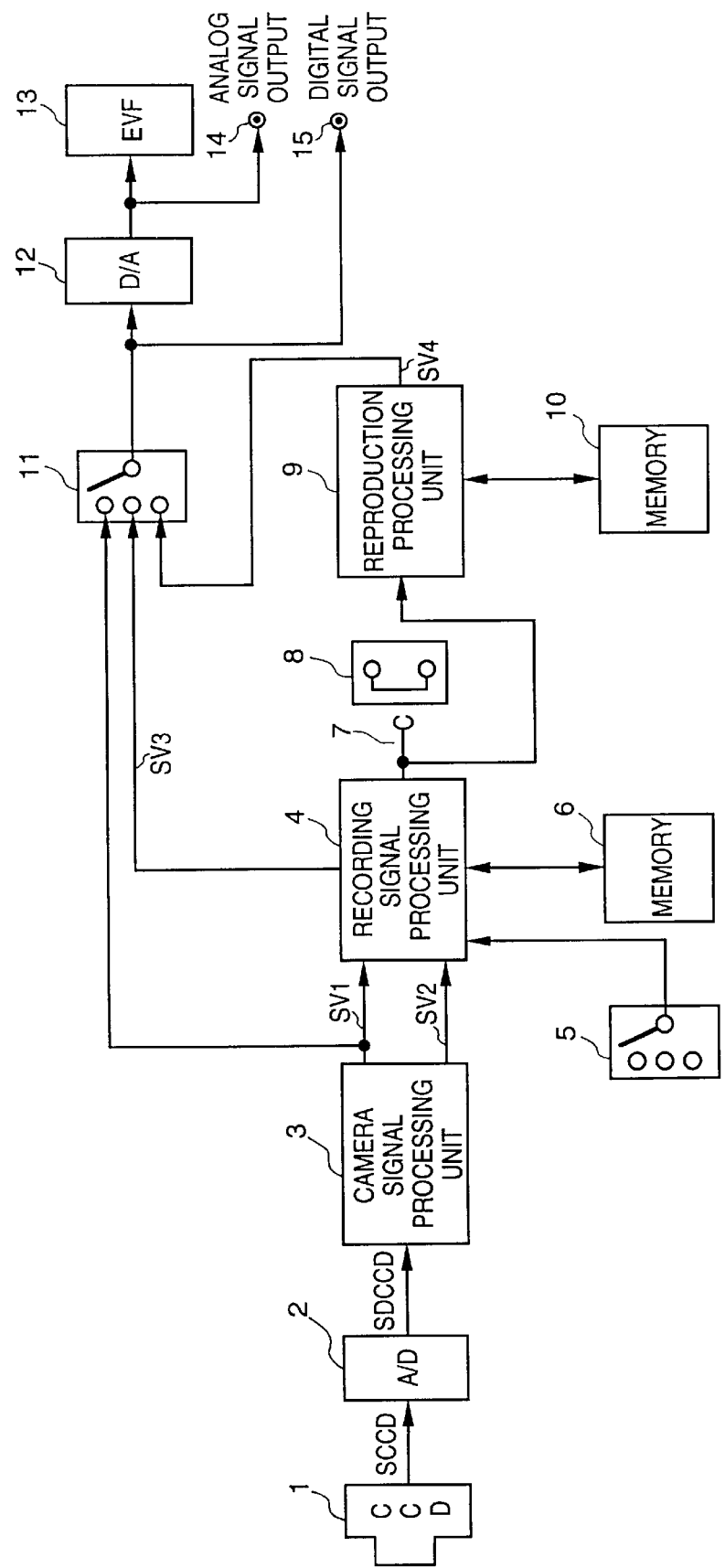
FIG. 1 is a block diagram illustrating a configuration of an image sensing apparatus according to the first embodiment of the present invention.

FIG. 1 is a block diagram illustrating an image sensing apparatus according to the first embodiment of the present invention in a form of a video camera. In FIG. 1, reference numeral 1 denotes a CCD which scans all of the light receiving pixels by a single non-interlace scanning operation, called, progressive scanning or all-pixel scanning; 2, an A/D converter for converting output signals from the CCD 1 into digital signals; 3, a camera signal processing circuit for performing various kinds of processes, such as clamping, γ correction, white clipping and dark clipping, on output signals from the A/D converter 2; 4, a recording signal processing unit for compressing and encoding the input digital video signals to convert into digital recording signals to be recorded on a tape; 5, a switch for switching recording modes of the recording signal processing unit 4; 6, a memory for temporarily storing image data, outputted from the camera signal processing circuit 3, compressed data and encoded data in the processes by the recording signal processing unit 4; 7, a record/play head; and 8, a tape.

Further, reference numeral 9 denotes a reproduction processing unit for applying error correction, decoding, expansion and drop-out correction to digital signals reproduced by the record/play head 7 to reproduce digital video signals; 10, a memory for temporarily storing error-corrected image data, decoded image data and expanded image data in the processes by the reproduction processing unit 9; 11, a switch for selecting output signals; 12, a D/A converter for converting digital video signals selected by the switch 11 into analog video signals; 13, an electronic view finder (EVF); 14, an analog output terminal; and 15, a digital output terminal.

Next, an operation of the video camera having the aforesaid configuration will be explained below.

An image of an object (not shown) is formed on an image sensing surface of the CCD 1 by an image sensing optical system which is not shown. Thereafter, the image of the object formed on the image sensing surface of the CCD 1 is photoelectric-converted into electric charges, and sequentially read out in accordance with driving pulses generated by a CCD driver (not shown). Further, the charges are transformed into voltages, and outputted as image signals SCCD. At this time, all of the light receiving pixels of the CCD are read out sequentially in a single image sensing operation without interlacing. For example, if the CCD 1 has about 380,000 pixels, then signals are read out from all the 380,000 pixels in a normal one field period, i.e., ⅟₆₀ second in a case of the NTSC standard, without adding two horizontal adjacent lines or interlacing.

The image signals outputted from the CCD 1 are converted into the digital image signals SDCCD by the A/D converter 2, and the digital image signals SDCCD are processed by the camera signal processing circuit 3, thereby, two streams of digital video signals, SV1 and SV2, are generated.

SV1 are standard digital video signals, such as digital video signals conforming to SMPTE 125M, for example. These are standard signals, therefore interlaced signals of television standard. The CCD 1 scans all of the light receiving pixels, however, SV1 do not include all the signals SCCD of pixels in all the lines. SV2 are signals for compensating SV1, and signals of pixels on lines which are not outputted as SV1 are outputted as SV2.

The recording signal processing unit 4 receives both of the signals SV1 and SV2, and records signals in accordance with a mode set by the switch 5.

In a first mode (field mode), normal interlaced video signals are recorded by generating digital signals for recording (called "digital recording signals", hereinafter) only from SV1.

In a second mode (frame mode), digital recording signals are generated by using both SV1 and SV2 in the first ⅟₆₀ second (a field period), then omitting both signals in the next ⅟₆₀ second, and repeating these operations. Accordingly, a still image can be obtained in every ⅟₃₀ second (a frame period) by combining SV1 and SV2, i.e., signals of two fields, when playing back images.

In a third mode, both SV1 and SV2 are used in the first ⅟₆₀ second, then both signals are omitted in the next ⅟₆₀ second, and repeating these operations as in the second mode. However, differing from the second mode, digital recording signals are not generated upon performing above operations, and the signals obtained after the omission are stored in the memory 6.

Thereafter, the stored signals are read out in interlaced form to generate signals SV3. Thus, by combining SV3 of two fields as in the case of playing back operation in the second mode, it is possible to obtain a still image in every ⅟₃₀ second without recording and playing back image data.

The recording signal processing unit 4 compresses and encodes the input digital video signals SV1 and SV2 by using the memory 6, and the digital recording signals generated after the above processes are recorded in the tape 8 by a record/play head 7.

When reproducing a recorded image, data stored in the tape 8 is read by the record/play head 7, and the play processing unit 9 performs error correction, decoding, expansion, drop-out correction on the read data, thereby generating reproduced video signals SV4.

In accordance with the mode selection by the switch 5, the switch 11 selects SV1 when recording, SV3 when the third mode is selected, or SV4 when reproducing an image. The selected signals are outputted from the digital output terminal 15 as a digital output, digital-analog converted by the D/A converter 12 and displayed on the EVF 13, or outputted from the analog output terminal 14 as an analog output.

FIG. 2 is an explanatory view showing a pixel arrangement of the image sensing surface of the CCD 1.

The CCD 1 is normally composed of about 640 pixels in each line and about 480 pixels in each column in the first embodiment. However, in FIG. 2, an area of only 8 pixels in the horizontal direction and 8 pixels in the vertical direction is shown so as to simplify explanations of the first embodiment. The pixels in FIG. 2 are labeled with reference numerals P00 to P77.

FIGS. 3A to 3E show away to scan the CCD 1 along with FIG. 2.

FIG. 3A shows image signals SCCD output from the CCD 1. As described above, pixels of the CCD 1 are scanned by non-interlace scanning, and the signals of all of the light receiving pixels are sequentially read out without being interlaced or added.

FIG. 3B shows an output SV1 of odd fields. Out of signals SCCD, only signals of the even lines are outputted.

FIG. 3C shows an output SV1 of even fields. Out of signals SCCD, only signals of the odd lines are outputted.

FIG. 3D shows an output SV2 of odd fields. Out of signals SCCD, signals in the odd lines, which are not outputted as SV1 of odd fields, are outputted.

FIG. 3E shows an output SV2 of even fields. Out of signals SCCD, signals in the even liens, which are not outputted as SV1 of even fields, are outputted.

FIGS. 4A to 4G show states of SV1, SV2 and SV3 when they are written to or read from the memory 6.

FIG. 4A shows SV1 in FIGS. 3B and 3C by field. As described above, signals of the even lines are outputted for the odd fields, and signals of the odd lines are outputted for the even fields.

FIG. 4B shows SV2 in FIGS. 3D and 3E by field. As described above, signals of the odd lines are outputted for the odd fields, and signals of the even lines are outputted for the even fields.

FIGS. 4C and 4D are for explaining operation to write image data to the memory 6 in the first mode (field mode). In the field mode, only the signals SV1 are written.

FIGS. 4E and 4F are for explaining operation to write image data to the memory 6 in the second mode (frame mode) and the third mode. In these modes, both the SV1 and SV2 are written to or omitted alternatively in ⅟₆₀ second.

FIG. 4G shows SV3 in the third mode. Among signals written in the memory 6, signals of the even lines are read out for the odd fields, and signals of the odd lines are read out for the even fields.

FIG. 5 shows an example of a mosaic color filter, used for separating colors, for sensing a color image with the CCD 1.

As shown in FIG. 5, red (R) filter chips and green (G) filter chips are alternatively arranged in the odd lines, and G filter chips and blue (B) filter chips are alternatively arranged in the even lines.

Figure 6:
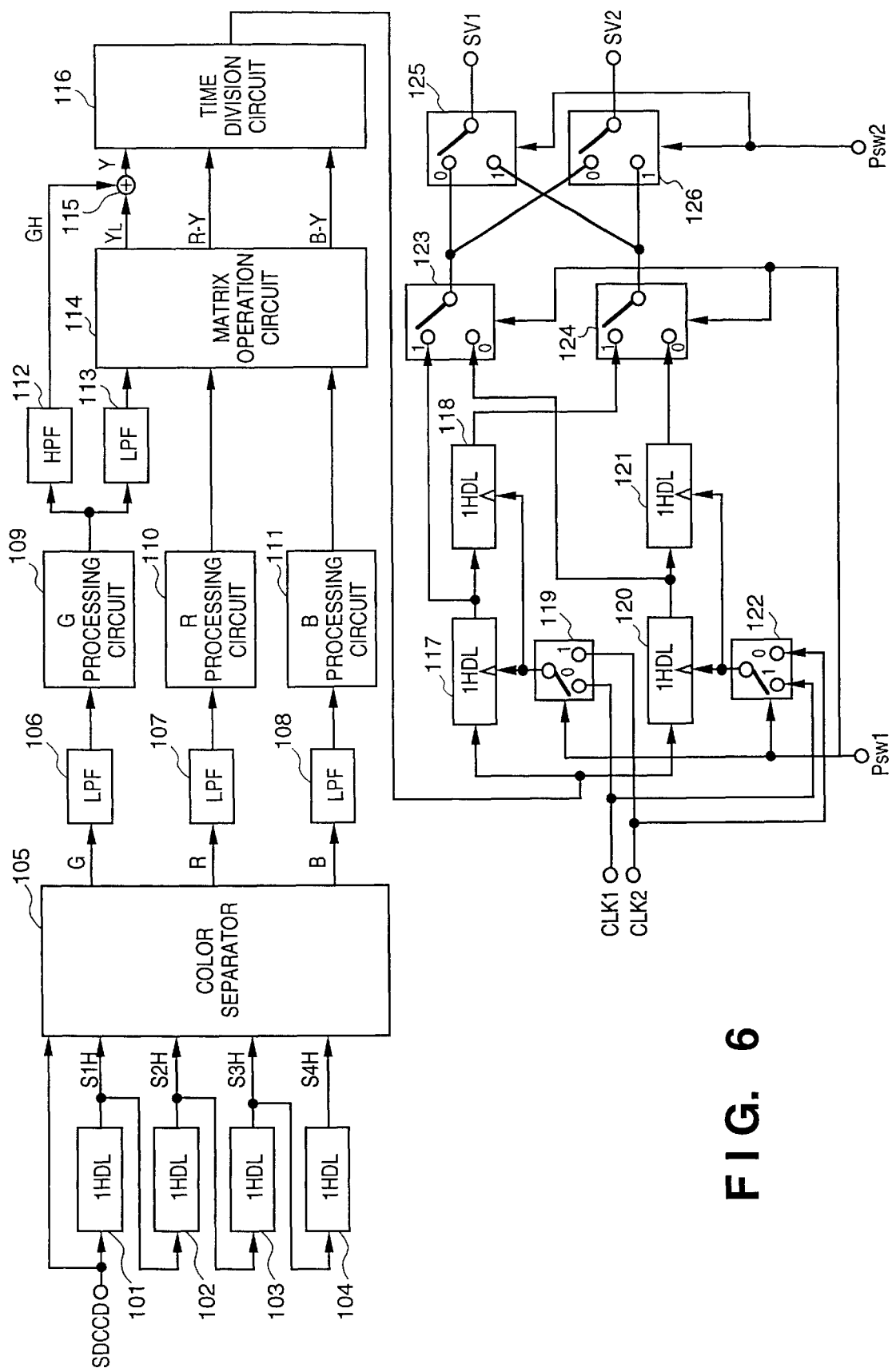
FIG. 6 is a block diagram illustrating a configuration of a camera signal processing circuit.

FIG. 6 is a block diagram illustrating an example of a configuration of a camera signal processing circuit 3 shown in FIG. 1.

Reference numerals 101, 102, 103 and 104 denote 1H delay lines each of which delays input signals for one horizontal scan period (1H); 105, a color separator for separating four image signals S1H to S4H delayed for 0 to 4 horizontal scan line periods, respectively, into primary color signals of R, G and B in accordance with timing signals generated by a timing signal generator (not shown); and 106, 107 and 108, low-pass filters (LPF). The LPF 106 passes a relatively wide frequency range, and the LPFs 107 and 108 passes signals in about the half frequency range of the LPF 106. Reference numerals 109, 110 and 111 denote G, R and B processing circuits, respectively, for performing processes, such as clamping, γ correction, white clipping and dark clipping.

Reference numeral 112 denotes a high-pass filter (HPF) and reference numeral 113 denotes a low-pass filter (LPF). The LPF 113 has almost the same characteristics as of the LPFs 107 and 108. The HPF has opposite characteristics to the LPF 113, more specifically, has the same cut-off frequency as of the LPF 113 and passes the signals which the LPF 113 does not pass. Further, reference numeral 114 denotes a matrix operation circuit for performing a matrix operation on the input R, G and B signals, and generates a luminance signal YL, and color difference signals R-Y and B-Y. Reference numeral 115 denotes an adder.

Reference numeral 116 denotes a time division circuit for generating time division video signals by switching the input Y, R-Y and B-Y signals in accordance with switching pulses generated by a timing signal generator (not shown). In a 4:2:2 format which is usually used, for example, R-Y signal of a pixel and B-Y signal of a pixel are selected while Y signals of two pixels are used, and the signals are sequentially outputted in an order of Y, R-Y, Y, Y-B, . . . , in time division. Note, the frequency of the switching pulse is two times higher than the sampling frequency of the Y signal.

Reference numerals 117, 118, 120 and 121 denote 1H delay lines, and reference numerals 119 and 122 to 126 are switches.

Next, an operation of the camera signal processing unit 3 having the above configuration will be described.

The input digital image signal SDCCD is first delayed by the 1H delay lines, 101 to 104, for 1H by each delay line. The delayed signals SH1 to SH4 and the input signal SDCCD enter the color separator 105 where those signals are separated into R, G and B signals in accordance with timing signals from a timing signal generator (not shown). The separated R, G and B signals enter the LPFs 107, 106 and 108, respectively, and low frequency components are extracted from each of the R, G and B signals. Note, G filter chips appear in every line as shown in FIG. 5, and the frequency of G signals is in a Nyquist frequency range of a sampling frequency of the CCD 1. Therefore, the frequency range of the LPF 106 is almost the same as that of the Nyquist frequency of the sampling frequency of the CCD 1. Regarding the R and B filter chips, they are arranged in every other line, and have a frequency of about half the sampling frequency of the G signals. Therefore, the frequency range of the LPF 107 and 108 is about half of the Nyquist frequency of the sampling frequency of the CCD 1.

The outputs from the LPFs 106 to 108 are processed with clamping, γ correction, white clipping, and dark clipping. Among these outputs, low frequency component of the G signals are extracted by the LPF 113 and outputted to the matrix operation circuit 114, while the R and B signals directly enter the matrix operation circuit 114 from the R and B processing circuits 110 and 111. The matrix operation circuit 114 generates luminance signals Y and color difference signals R-Y and B-Y from each of the R, G and B signals in accordance with a standard ratio of the standard television signal by matrix operation.

In the NTSC standard, for example,

YL=0.3R+0.59G+0.11B

R-Y=0.7R−0.59G−0.11B

B-Y=0.3R−0.59G−0.89B

Out of the above outputs, the signal YL is added to a high frequency component GH, obtained by letting the output from the G processing circuit 109 pass through the LPF 112, in the adder 115, thereby the luminance signal Y is generated.

The Y, R-Y and B-Y signals are outputted by being switched in accordance with a clock having two times higher frequency than the frequency of the sampling clock for Y, and become time division video signals.

The time division video signals are delayed by the 1H delay lines 117, 118, 120 and 121. Operation clocks for these delay lines are either CLK1 or CLK2 selected in accordance with timing pulses PSW1 generated by a timing signal generator (not shown). More concretely, in accordance with the timing pulses PSW1, either the sampling clock of the time division video signal, CLK1, or an output clock CLK2 having about a half frequency of the CLK1, are switched by a period which is two times as long as the one horizontal scan line period, 1H, shown in FIG. 3A, of the CCD 1. As for the order of switching, in the first two 1H periods (i.e., 2H period), the delay lines 117 and 118 connect to the CLK1 whereas the delay lines 120 and 121 connect to the CLK2, and in the next 2H period, the delay lines 117 and 118 connect to the CLK2 whereas the delay lines 120 and 121 connect to the CLK1.

Switches 123 and 124 select outputs from the delay lines which are operated in accordance with the clock CLK2, and switches 125 and 126 switch inputs in accordance with the switch pulses PSW2, having a period of two fields, generated by a timing signal generator (not shown). Accordingly, the signals SV1 and SV2 shown in FIGS. 3B to 3E are generated. Only the luminance signal components are shown in FIGS. 3B to 3E, however, the outputs, SV1 and SV2 in the first embodiment are actually time division multiplexed signals of Y, R-Y and B-Y by a frequency which is two times higher than the sampling frequency.

Acceding to the first embodiment, since a primary color filter is provided in front of the CCD 1, color reproduction of an image is high. Further, since the high frequency component of the luminance signals Y are generated on the basis of the G signals only, even in a case where a color object is sensed or color temperature of a light source is changed, video signals of high quality with less moire, generally caused by the change of the ratio of color components, can be obtained.

Furthermore, since color separation is performed by using signals of five horizontal lines, a chance of false color signal generation caused by partial change of luminosity can be reduced.

Furthermore, upon performing color separation, frequency band width is limited in the vertical direction, however, by setting the frequency characteristics rapidly, video signals with low false signals and of high resolution can be obtained. Furthermore, luminance signals are obtained by performing matrix operation on γ corrected R, G and B signals, differing from the ordinary method, used for single CCD-type image sensing method, of performing γ correction on the luminance signals and color signals separately. Accordingly, deterioration of color reproduction, such as a drop of the chromaticness and change of hue in a half tone range, remains small.

Acceding to the first embodiment as described above, for watching a moving image on a television screen, the ordinary interlaced images are sensed, and the interlaced image signals are recorded and played by setting to the first mode. Further, to watch a reproduced image as a still image, to print a reproduced image or to input a reproduced image to a computer, still images are sensed by frame, recorded and played by setting to the second mode. An image obtained in the second mode has a high vertical resolution since no lines of a CCD is skipped and no signals of two adjacent lines are added when scanning the CCD. Therefore, when a still image is inputted to a video printer or a computer, each shape of pixel does not have to be corrected, and the obtained image has almost the same resolution both in the vertical and horizontal directions.

Furthermore, it is possible to output a still image by frame without recording and reproducing image signals while performing image sensing by setting to the third mode. Accordingly, it is possible to perform pre-image sensing operation, direct print of a sensed image by a video printer and input of sensed images of high vertical resolution to a computer by frame without using a tape.

<Second Embodiment>

Figure 7:
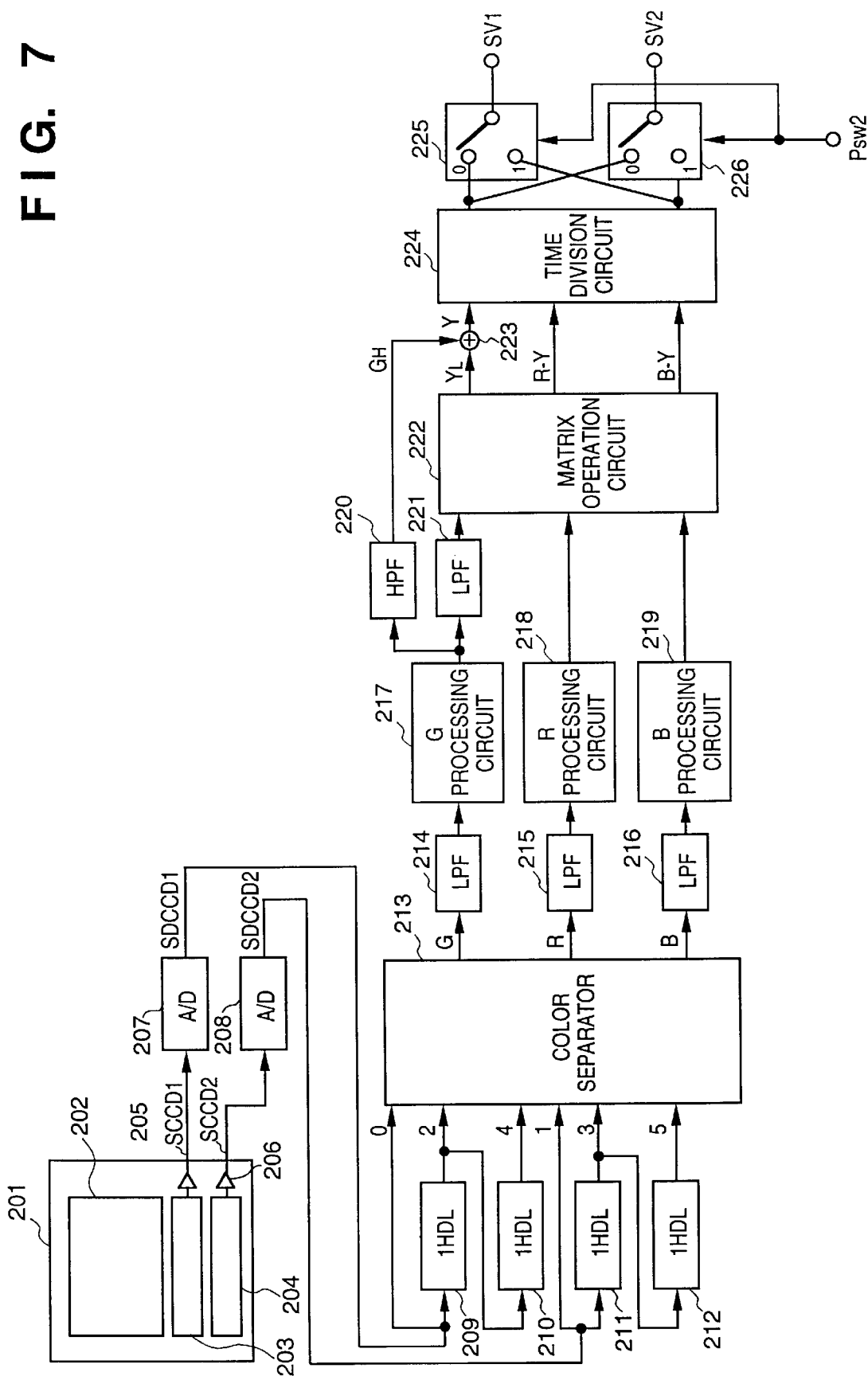
FIG. 7 is a block diagram illustrating a configuration of a part of an image sensing apparatus according to a second embodiment of the present invention.

FIG. 7 is a block diagram illustrating a configuration of a part of an image sensing apparatus corresponding to the A/D converter 2 and the camera signal processing circuit 3 shown in FIG. 1 according to a second embodiment of the present invention.

In FIG. 7, reference numeral 201 denotes a non-interlace or progressive scanning type CCD similarly to the CCD 1 used in the first embodiment, however, it has a different configuration in the horizontal charge transfer part as will be described later. Reference numeral 202 denotes the image sensing surface of the CCD 201, where an optical image is converted into electrical charges. Reference numerals 203 and 204 denote horizontal shift registers, and there are two, while there is one in the CCD 1. Reference numerals 205 and 206 denote charge-voltage conversion amplifier; 207 and 208, A/D converters for converting input image signals SCCD1 and SCCD2 into digital image signals SDCCD1 and SDCCD2; 209 to 212, 1H delay lines; and 213, a color separator for separating the input six signals into primary color signals, namely, R, G and B signals, in accordance with timing pulses generated by a timing signal generator (not shown). Upon separating input signals, the color separator 213 separates signals of two horizontal lines into primary color signals simultaneously, and multiplexes and outputs the separated signals.

Reference numerals 214 to 216 are LPFs. The LPF 214 has a higher cutoff frequency, and the LPFs 215 and 216 has about half the cutoff frequency of the LPF 214. Note, since the R, G and B signals inputted to each LPFs are time division multiplexed signals of two horizontal lines, R, G and B signals originated from the same line are processed at the same time. For example, if the LPF 214 is composed of tap delays of D-type flip-flops and a finite impulse response filter to an adder, the LPF 214 is to be configured so that the signals to be inputted to the adder are from the even or odd number taps.

Reference numerals 217 to 219 denote G, R and B processing circuits, respectively, for performing clamping, γ correction, white clipping and dark clipping. These G, R and B processing circuit are configured so as to be capable of dealing with time division multiplexed signals, as the LPF 214, for example. In order to detect a black reference signal by using a clamping circuit, for instance, integrators of optical black signal for the odd lines and even lines are provided independently, then the respective outputs from integrators are subtracted from image signals outputted from pixels in odd lines and even lines, respectively.

Reference numeral 220 denotes a HPF and 221, a LPF. The LPF 221 has almost the same characteristics as of the LPFs 215 and 216, and also configured so as to be able to deal with time division multiplexed signals. The HPF 220 has characteristics opposite to the LPF 221, more specifically, has the same cut-off frequency as of the LPF 221 and passes the signals which the LPF 221 does not pass, and also configured so as to deal with the time division multiplexed signals. Reference numeral 222 denotes a matrix operation circuit which performs matrix operation on input R, G and B signals to generate luminance signals YL and color difference signals R-Y and B-Y. Reference numeral 223 denotes an adder.

Further, reference numeral 224 denotes a time division circuit which switches the input Y, R-Y and B-Y signals on the basis of switching pulses generated by a timing signal generator (not shown), thereby generating a time division video signals, similarly to the time division circuit 116 in the first embodiment. Note, the input signals to the time division circuit 224 are time division multiplexed signals, therefore, the frequency of the sampling clock for inputting signals and that for outputting signals are the same.

Reference numerals 225 and 226 are switches.

Next, an operation of the above configuration will be described below.

An optical image of an object (not shown) is formed on the image sensing surface 202 of the CCD 201. In the CCD 201, the image of the object formed on the image sensing surface 202 is converted into electric charges. Thereafter, the charges on an odd line are transferred to the horizontal shift register 203 and charges on an even line are transferred to the horizontal shift register 204 in accordance with driving pulses generated by a CCD driver (not shown). Then, the charges in the horizontal shift registers 203 and 204 are sequentially read out by being transferred in the horizontal direction, converted into voltage signals by the charge-voltage conversion amplifiers 205 and 206, then outputted as the image signals SCCD1 and SCCD2, respectively. Namely, signals of two horizontal lines are outputted in a single horizontal scan line period. Therefore, the sampling clock frequency for shifting is a half of the sampling frequency for driving a CCD with a single horizontal shift register as shown in FIG. 1.

Next, these two image signals SCCD1 and SCCD 2 are analog-digital converted by the A/D converters 207 and 208, respectively, and become digital image signals SDCCD1 and SDCCD2. The sampling clock frequency of digital image signals are also a half of the sampling clock frequency of the A/D converter 2 shown in FIG. 1 as in the case of scanning the CCD 201. The two A/D converted digital image signals SDCCD1 and SDCCD 2 are delayed for one horizontal scan line period (1H) by the 1H delay lines 209 and 211, respectively. The outputs from the 1H delay lines 209 and 211 are further delayed by the 1H delay lines 210 and 212, respectively. Thereafter, signals delayed by the 1H delay lines and the signals inputted to them primary are separated into R, G and B signals in accordance with timing signals from a timing signal generator (not shown). Upon separating into primary color signals, the color separator 213 separates signals of two horizontal lines and multiplexes the separated signals in time division, then outputs time division multiplexed signals, as described above.

The separated G, R and B signals enter the LPFs 214 to 216, respectively, where low frequency components are extracted. Note, each LPF extracts low frequency components of each of the time division multiplexed signals of two horizontal lines separately, and outputs as time division signals. The LPF 214 has almost the same frequency range as the Nyquist frequency of the sampling frequency of the CCD 201, and the LPFs 215 and 216 have frequency ranges of about a half of the Nyquist frequency of the sampling clock of the CCD 201.

The outputs from the LPFs 214 to 216 are applied with clamping, γ correction, white clipping and dark clipping by the G, R and B processing circuits 217, 218 and 219, respectively. Note, each of the G, R and B processing circuits is also configured so as to able to deal with time division signals. Among those outputs, low frequency components of the G signals are extracted by the LPF 221 and outputted to the matrix operation circuit 222, and the R and B signals enter the matrix operation circuit 222 directly from the R and B processing circuits 218 and 219. The matrix operation circuit 222 generates luminance signals YL and color difference signals R-Y and B-Y from the R, G and B signals in accordance with a ratio of the television standard by matrix operation. Out of the signals generated by the matrix operation circuit 222, the signals YL are added to high frequency components GH, obtained by letting the output from the G processing circuit 217 pass through the HPF 220, in the adder 223, thereby the luminance signals Y are generated.

The Y, R-Y and B-Y signals obtained as above are outputted from the time division circuit by switching input terminals in accordance with timing signals generated by a timing signal generator (not shown), and become time division video signals.

The time division video signals are switched by the switches 225 and 226 in accordance with switching pulses PSW2, having the two field period, generated by a timing signal generator (not shown), thereby the signals SV1 and SV2 shown in FIGS. 3B to 3E are obtained.

According to the second embodiment, clock frequencies for the horizontal shift registers 203 and 204 of the CCD 201, the charge-voltage conversion amplifiers 205 and 206, the A/D converters 207 and 208, and 1H delay lines are the half of the frequencies of the first embodiment, it is possible to realize the image sensing apparatus with simple circuits requiring less energy. Further, the number of 1H delay lines required in the second embodiment is four, thereby it is possible to reduce the size of the image sensing apparatus and driving energy.

FIGS. 8A to 8E are for explaining operation in the second embodiment.

Figure 8A:
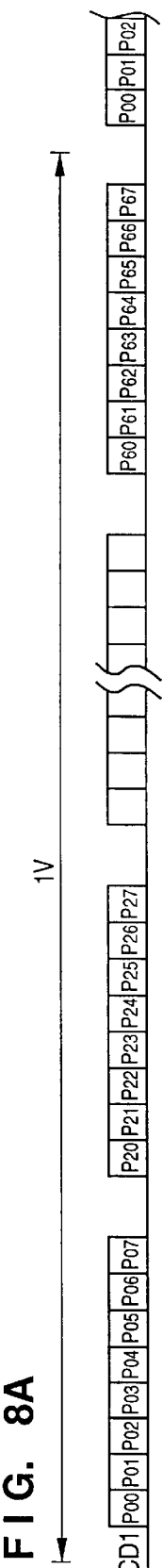
FIGS. 8A to 8E are timing charts representing an operation in the second embodiment.
Figure 8B:
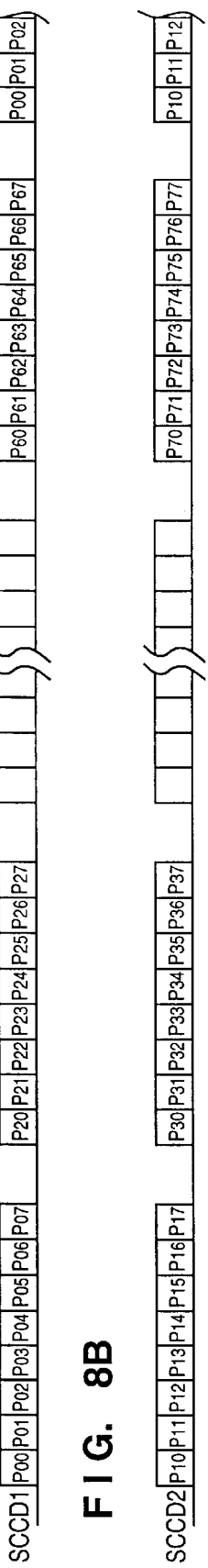

FIG. 8A shows the output signals SCCD1 and FIG. 8B shows the output signals SCCD2. The charges stored in pixels, arranged as shown in FIG. 2, in the even lines are read out as SCCD1, and the charges stored in pixels in the odd lines are read out as SCCD2. This relationship is maintained in the next field period. The sampling clock is a half of the sampling clock of the SCCD shown in FIG. 3A.

Figure 8C:
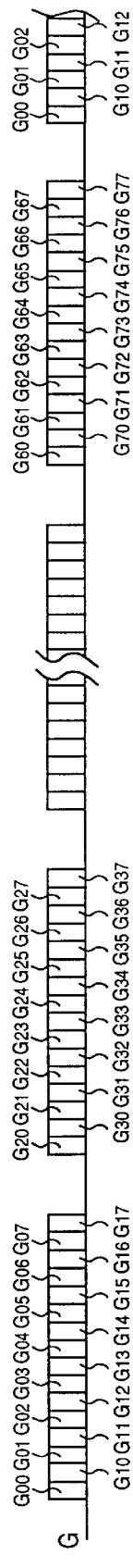

FIG. 8C shows G signals outputted from the color separator 213. Signals of the two horizontal lines are outputted in time division, as in the order G00, G10, G01, G11, and so on. Note, the two numbers after the letter "G" correspond to the numbers after the letter P showing the pixel positions in FIG. 2.

Figure 8D:
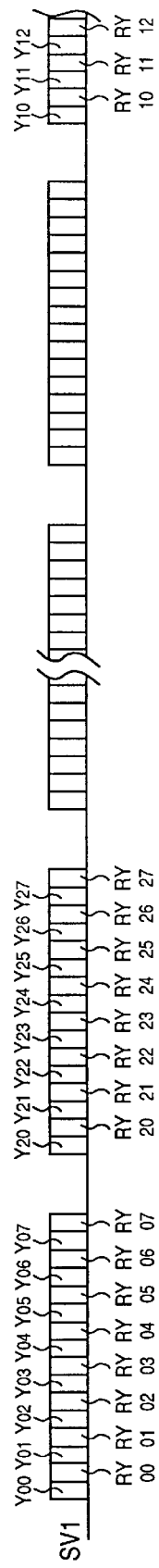
Figure 8E:
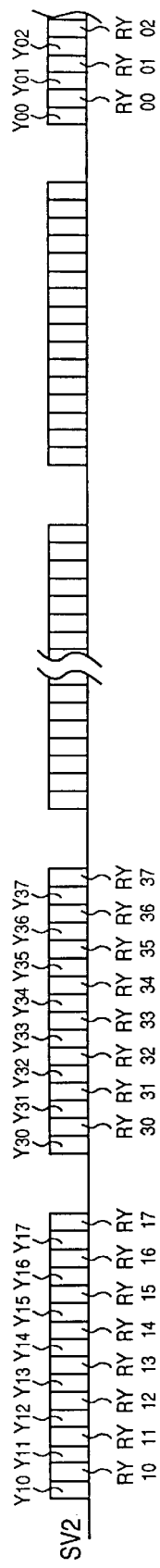

FIG. 8D shows SV1 outputted from the switch 225 and FIG. 8E shows SV2 outputted from the switch 226. SV1 are time division multiplexed signals of the luminance signals Y and the color difference signals R-Y and B-Y, and the ratio of sampling clock frequencies of these signals is 2:1:1. In addition, SV1 are interlaced signals obtained by alternatively outputting the signals of the even lines of the CCD 201 or the signals of the odd lines in each field period. SV2 are remaining signals which are not outputted as SV1. Therefore, when signals of the even lines are outputted as SV1, then signals of the odd lines are outputted as SV2. Similarly, when signals of the odd lines are outputted as SV1, then signals of the even lines are outputted as SV2.

Figure 9:
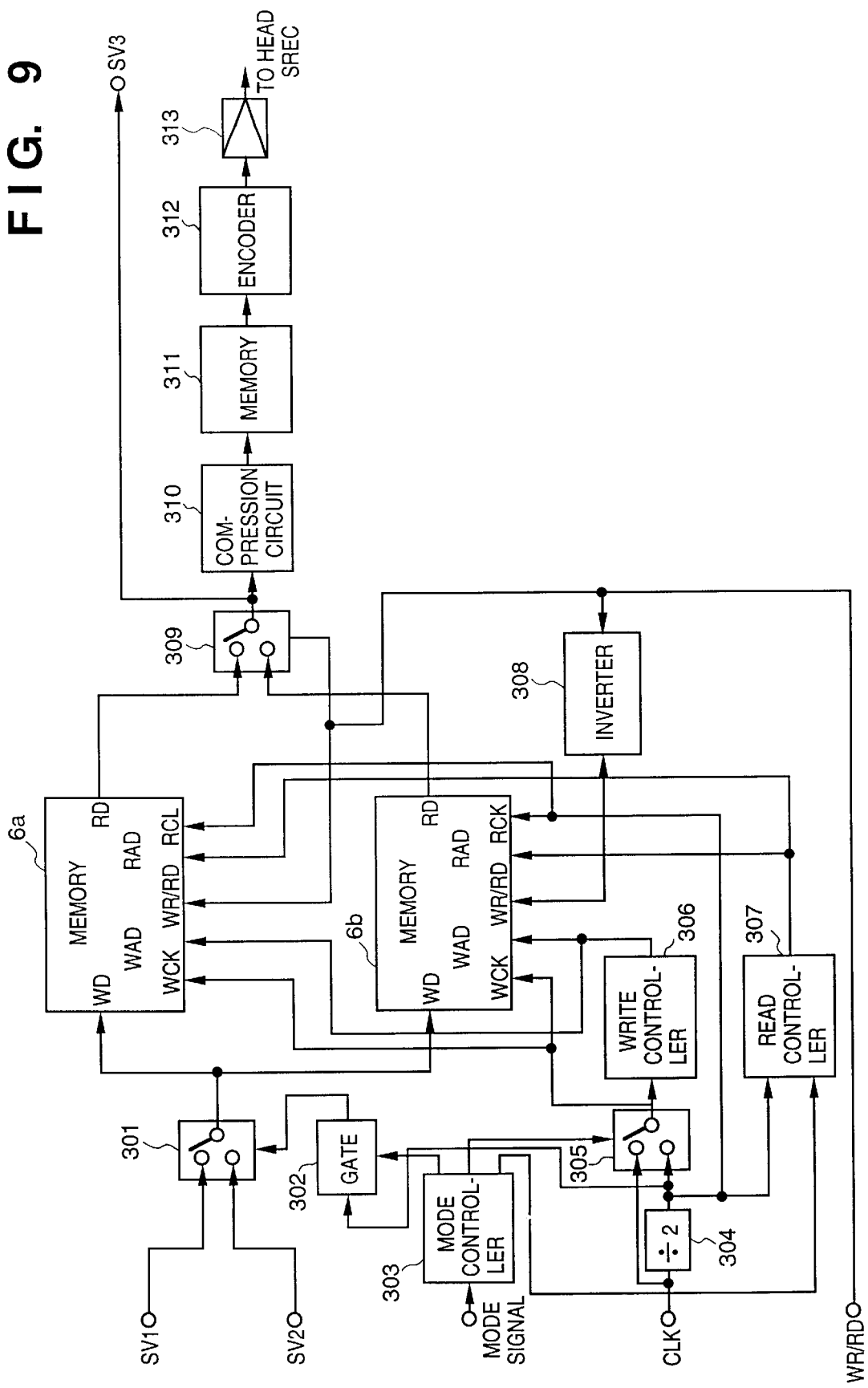
FIG. 9 is a block diagram illustrating a configuration of a recording signal processing unit and a memory used in the first and second embodiments.

FIG. 9 is a block diagram illustrating a configuration of the recording signal processing unit 4 and the memory 6 used in the first and second embodiment.

In FIG. 9, reference numeral 301 denotes a switch; 302, a gate; 303, a mode controller; 304, a frequency divider; 305, a switch; 306, a write controller; 307, a read controller; 308, an inverter; 309, a switch; 310, a compression circuit for applying a discrete cosine transform and quantization; 311, a memory for storing compressed data; 312, an encoder for encoding input signals into codes which are suitable for tape recording; and 313, a head amplifier. Reference numerals 6a and 6b show the memory 6 in the divided manner.

Next, the operation of the aforesaid configuration will be described.

The signals SV1 and SV2 are first inputted to the switch 301. When the switch 5 for setting a mode shown in FIG. 1 is set to the first mode, the mode controller 303 keeps the state in which the switch 301 selects SV1 by turning off the gate 302. In contrast, when the switch 5 is set to the second mode or the third mode, the mode controller 303 controls to provide an output from the frequency divider 304 to the switch 301 by turning on the gate 302, thereby SV1 and SV2 are inputted in time division as the switch 301 switches the input terminals for SV1 and SV2 alternatively. The output from the switch 301 enters data input terminals WD for writing to the memories 6a and 6b.

Clock selected by the switch 305 is inputted to clock terminals for writing, WCK, of the memories 6a and 6b. In the first mode, the mode controller 303 controls the switch 305 to select the clock which is divided by two by the frequency divider 304, thereby the selected divided clock is supplied to the memories 6a and 6b as the clock for writing (write clock). Further, the output of the switch 305 is also supplied to the write controller 306 in the first mode, and the write controller 306 generates write addresses in accordance with the divided clock, then supplies the generated write addresses to the memories 6a and 6b.

When the second or third mode is selected, the mode controller 303 controls the switch 305 to select the clock which is not divided by the frequency divider 304, and the non-divided clock is supplied to the memories 6a and 6b as the write clock. At the same time, the write controller 306 generates write addresses in accordance with the non-divided clock in the second or third mode, then the generated write addresses are supplied to the memories 6a and 6b.

Further, a write/read control signal WR/RD having two frame period (a frame period) generated by a timing signal generator (not shown) is inputted to a write/read control terminal WR/RD of the memory 6a, and an inverted signal of the write/read control signal WR/RD is inputted to a write/read control terminal WR/RD of the memory 6b through the inverter 308. Thereby, the memories to which data is written or the memoirs from which data is read are changed alternatively by frame.

Further, to read clock terminals RCK of the memories 6a and 6b, the divided clock outputted from the frequency divider 304 is supplied regardless of a mode selected.

To read address terminals RAD of the memories 6a and 6b, address signals generated by the read controller 307 are supplied. In the first and second mode, the mode controller 303 controls the read controller 307 so as to read out a frame by shuffling in a predetermined order by block, which is necessary for recording on a tape, on the basis of the divided clock outputted from the frequency divider 304. Then, addresses generated in this operation are used to read out data from the selected memory out of the memories 6a and 6b. In the third mode, the mode controller 303 controls the read controller 307 so as to generate addresses for normal interlace raster scanning on the basis of the divided clock outputted from the frequency divider 304, then data is read out from a selected memory similarly to the above operation.

The data from the memory 6a and 6b are selected by the switch 309, then outputted as SV3 to the switch 11 shown in FIG. 1. At the same time, the data read out from the memory 6a and 6b is compressed with the discrete cosine transform and quantization by the compression circuit 310, temporarily stored in the memory 311, thereafter encoded into codes which are suitable for tape recording by the encoder 312. Then, the head amplifier 313 amplifies the codes to the appropriate amplitude and provides it to the head 7 as recording signals SREC.

Acceding to the second embodiment, when an operator presses an external button for executing so-called still image operation, for example, by stopping the write/read signals WR/RD to change between on and off by every 2 frame periods, thus fixing either the memory 6a or 6b from which data is read, it is possible to perform the still image operation which temporarily freezes an image.

Further, by stopping the writing operation to the memory 311 correspondingly and by causing the read controller 307 to generate addresses for interlace raster scanning, as in the third mode, it is possible to record a still image while monitoring the same image represented by SV3.

Note, in the second embodiment, three memories, 6a, 6b and 311 are used, however, it is also possible to replace the three memories with a single memory having large capacity whose control lines, such as address lines, can be switched in time division. Accordingly, it is possible to reduce the number of semi-conductor memories to be used, thereby reducing the size of the image sensing apparatus.

According to the second embodiment as described above, it is also possible to achieve the same advantages as those of the first embodiment. Further, since the frequency of the clock for the 1H delay lines is half of the frequency used in the first embodiment, it is possible to configure the image sensing apparatus with relatively simple circuits which consume less energy. Furthermore, only four 1H delay lines are necessary, thereby down-sizing the apparatus as well as reducing the required energy for driving the apparatus.

<Third Embodiment>

According to the first and second embodiment as described above, in order to output signals of all of the light receiving pixels of an image sensing unit which are scanned by non-interlace scanning to improve resolution of a still image as a moving image, the obtained image signals have to be processed so as to be suitable for a moving image. This requires considerable useless processes, thus consuming more energy. In the third embodiment, an image sensing apparatus which does not perform useless processes will be explained.

Figure 10:
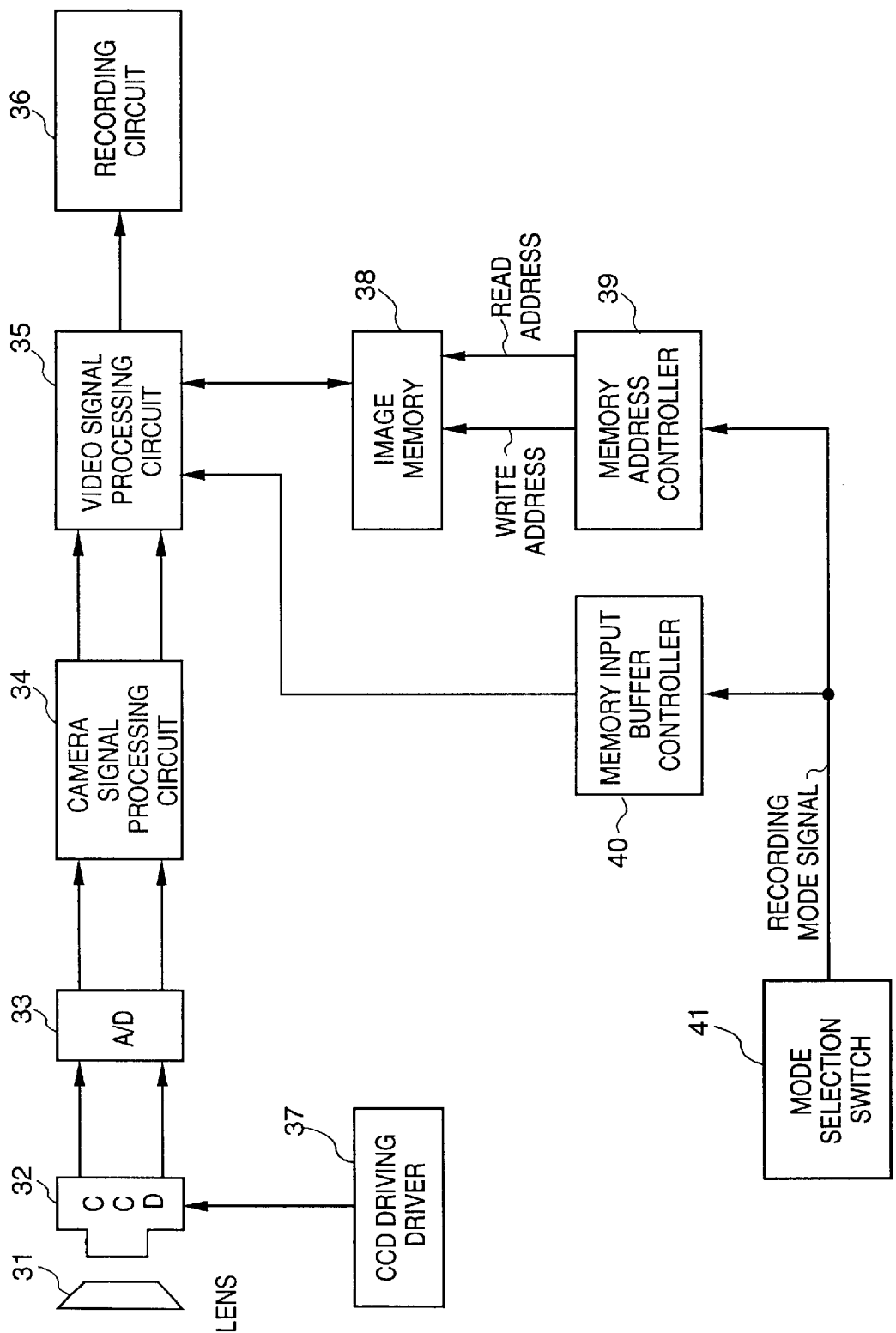
FIG. 10 is a block diagram illustrating a configuration of an image sensing apparatus according to a third embodiment of the present invention.

FIG. 10 is a block diagram illustrating a configuration of an image sensing apparatus according to the third embodiment. In FIG. 10, reference numeral 31 denotes a lens; 32, a CCD as an image sensing element for converting optical image signals of an object into electrical signals; 33, an A/D converter for converting analog signals to digital signals; 34, a camera signal processing circuit for transforming digitized image signals outputted from the A/D converter 33 into video signals by field; 35, a video signal processing circuit for compressing the video signals as well as transforming the compressed video signals into recording data suitable for magnetic recording; 36, a recording circuit for magnetically recording the recording data on a magnetic tape or the like; 37, a CCD driver for controlling timing of the CCD 32 for image sensing operation; 38, an image memory for storing image data; and 39, a memory address controller for controlling write/read addresses of the image memory 38.

Further, reference numeral 40 denotes a memory input buffer controller for controlling the video signal processing circuit 34 in accordance with a mode designated by a mode selection switch 41, and 41, the mode selection switch for selecting either a moving image recording mode or a still image recording mode.

As for the CCD 32, a progressive scanning type or all-pixel scanning type (i.e., non-interlace scanning type) image sensing device, driven by the CCD driver 37, capable of sensing a frame image in a field period is used.

Next, an operation of the image sensing apparatus having the above configuration is explained.

An image, of an object, which passes through the lens 31 is photo-electric converted by the CCD 32, and electric image signals carrying image information by frame are generated.

The non-interlace scanning type CCD 32 has two output systems, one is for outputting signals of even lines and the other is for outputting signals of odd lines. The output signals from the CCD 32 are converted into digital signals by the A/D converter 33, then enter the camera signal processing circuit 34. The camera signal processing circuit 34 performs aperture correction, high luminance color knee correction, white balance correction, γ correction, matrix operation, addition of a synchronization signal, AF preprocessing, AE preprocessing, and so on, on the input digital signals as well as separates the input digital signals by frame into two streams of video signals which are time division multiplexed signals of luminance signals and color difference signals by interlaced field, and outputs them. These two streams of video signals then enter the video signal processing circuit 35. The video signal processing circuit 35 is controlled by the memory input buffer controller 40 which controls data to be written into a buffer memory, that will be explained later, in accordance with a recording mode selected by the mode selection switch 41.

The video signal processing circuit 35 performs shuffling, orthogonal transform, quantization, encoding, modulation, and so on, depending upon a recording mode selected by the mode selection switch 41. The modulated recording data is inputted to the recording circuit 36 and recorded on a magnetic medium.

Figure 11:
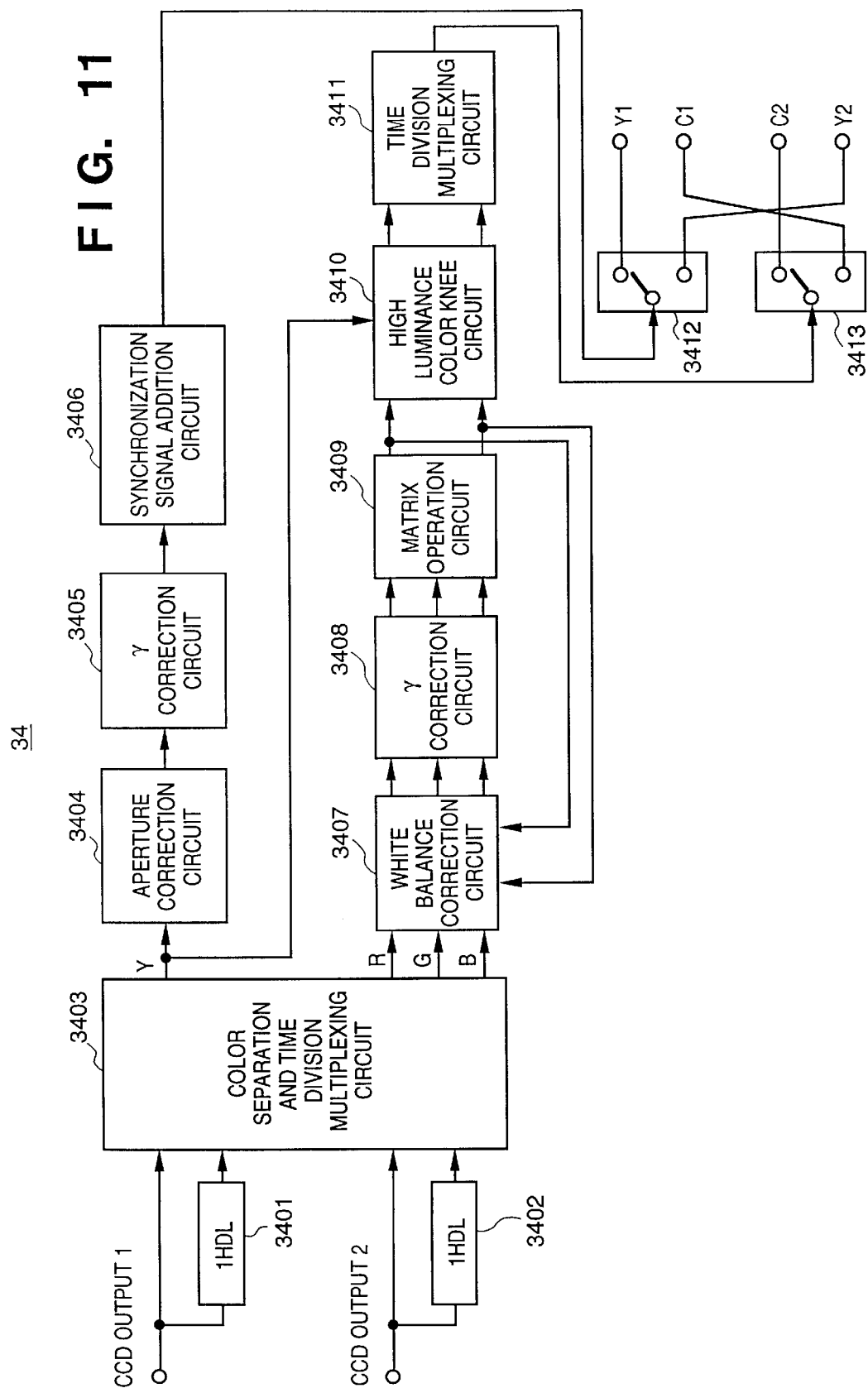
FIG. 11 is a block diagram illustrating a configuration of a camera signal processing circuit.

FIG. 11 is a block diagram illustrating a configuration of the camera signal processing circuit 34. In FIG. 11, reference numerals 3401 and 3402 denote 1H delay lines; 3403, a color separation and time division multiplexing circuit for separating each of the two streams of output signals from the CCD 32 into luminance signals and R, G and B signals, thereafter multiplexes these signals of two streams in time division; 3404, an aperture correction circuit; 3405, a γ correction circuit; 3406, a synchronization signal addition circuit; 3407, a white balance correction circuit; 3408, a γ correction circuit; 3409, a matrix operation circuit; 3410, a high luminance color knee circuit; 3411, a time division multiplexing circuit; and 3412 and 2413, selectors.

Next, an operation of the third embodiment will be described.

The A/D converter 33 outputs signals from two output terminals which simultaneously output data of two lines of the CCD 32. The two streams of output signals are separated into luminance signals Y and R, G and B signals, and these signals of the two streams (two lines) are multiplexed in time division by the 1H delay lines 3401 and 3402 and the color separation and time division multiplexing circuit 3403. The luminance signals Y are corrected its high frequency component by the aperture correction circuit 3404, further applied with γ correction by the γ correction circuit 3408, added with a synchronization signal by the synchronization signal addition circuit 3406, then enter the selector 3412.

Meanwhile, the R, G and B signals are applied with white balance correction by the white balance correction circuit 3407 and γ correction by the γ correction circuit 3408, then become color difference signals (R-Y and B-Y) by the matrix operation circuit 3409. These color difference signals are used for adjusting white balance of signals inputted to the white balance correction circuit 3407. Further, when aforesaid color difference signals are of high luminance, they are restricted by the high luminance color knee circuit 3410 in accordance with the luminance signals Y. Thereafter, the signals from the high luminance color knee circuit 3410 are multiplexed in time division by time division multiplexing circuit 3411 and inputted to the selector 3413.

The luminance signals Y and the time division multiplexed color difference signal are multiplexed in time division by the selectors 3412 and 3413 so that outputs from each selector is signals of even lines or signals of odd lines alternatively outputted by each field. Therefore, both of the two streams of outputs, (Y1, C1) and (Y2, C2), are signals of field, sensed in different image sensing timing, which are continuously outputted.

Figure 12:
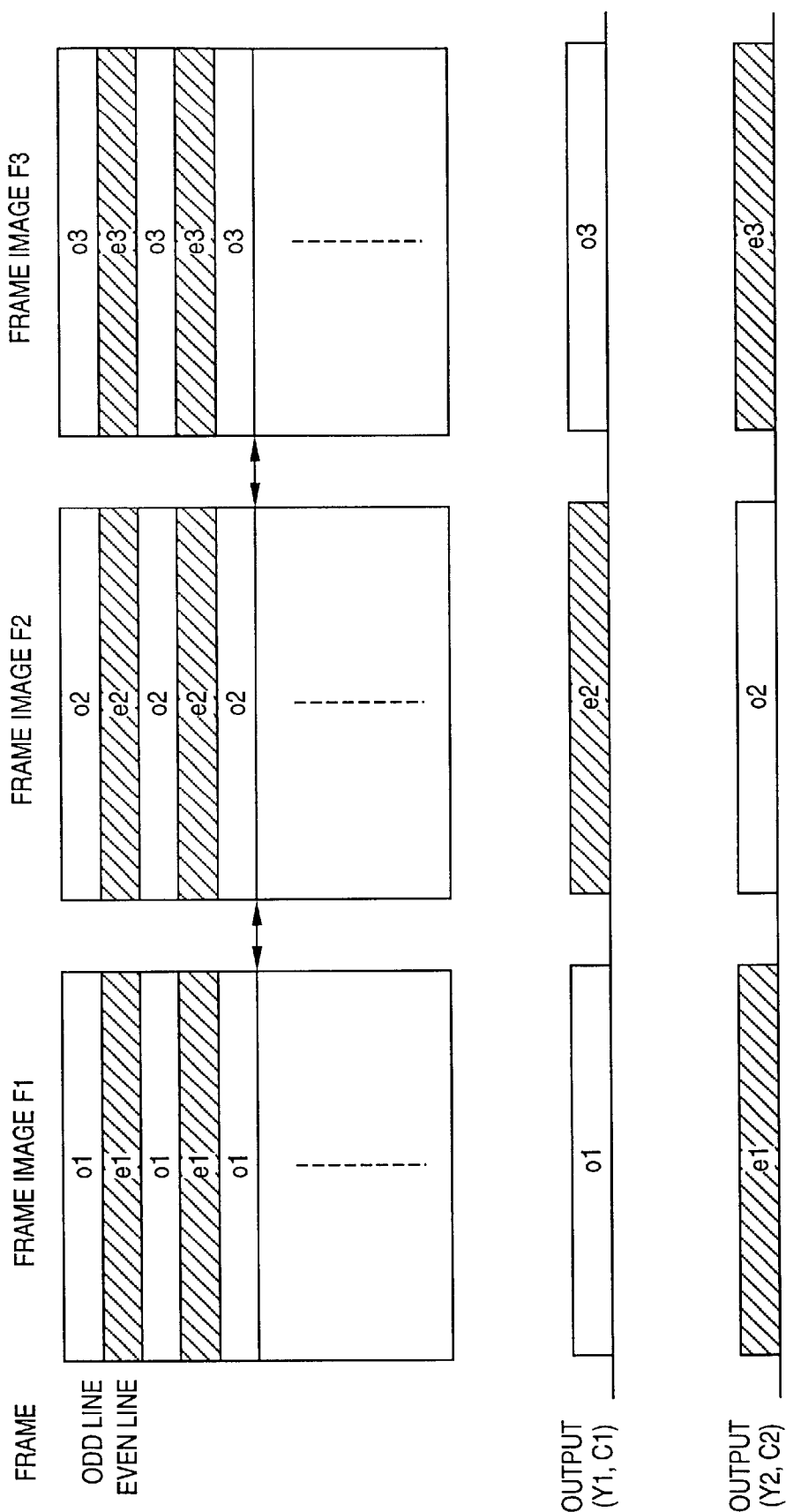
FIG. 12 is an explanatory view showing outputs from the camera signal processing circuit.

FIG. 12 is a timing chart showing an output from the camera signal processing circuit 34.

In FIG. 12, frame images, F1, F2 and F3, sensed at consecutive image sensing timing are shown. The timing of sensing frame images is the same as the conventional timing of sensing field images (e.g., about 60 Hz in NTSC). At this time, as one output of the camera signal processing circuit 34, (Y1, C1), data of odd lines of the frame image F1, namely o1 (luminance signals Y and time division multiplexed color difference signals), data of even lines of the frame image F2, namely e2 ("), and data of odd lines of the frame image F3, namely o3 ("), are outputted. Further, as the other output, (Y2, C2), data of even lines of the frame memory F1, namely e1 ("), data of odd lines of the frame image F2, namely o2 ("), and data of even lines of the frame image F3, namely e3 ("), are outputted.

Figure 13:
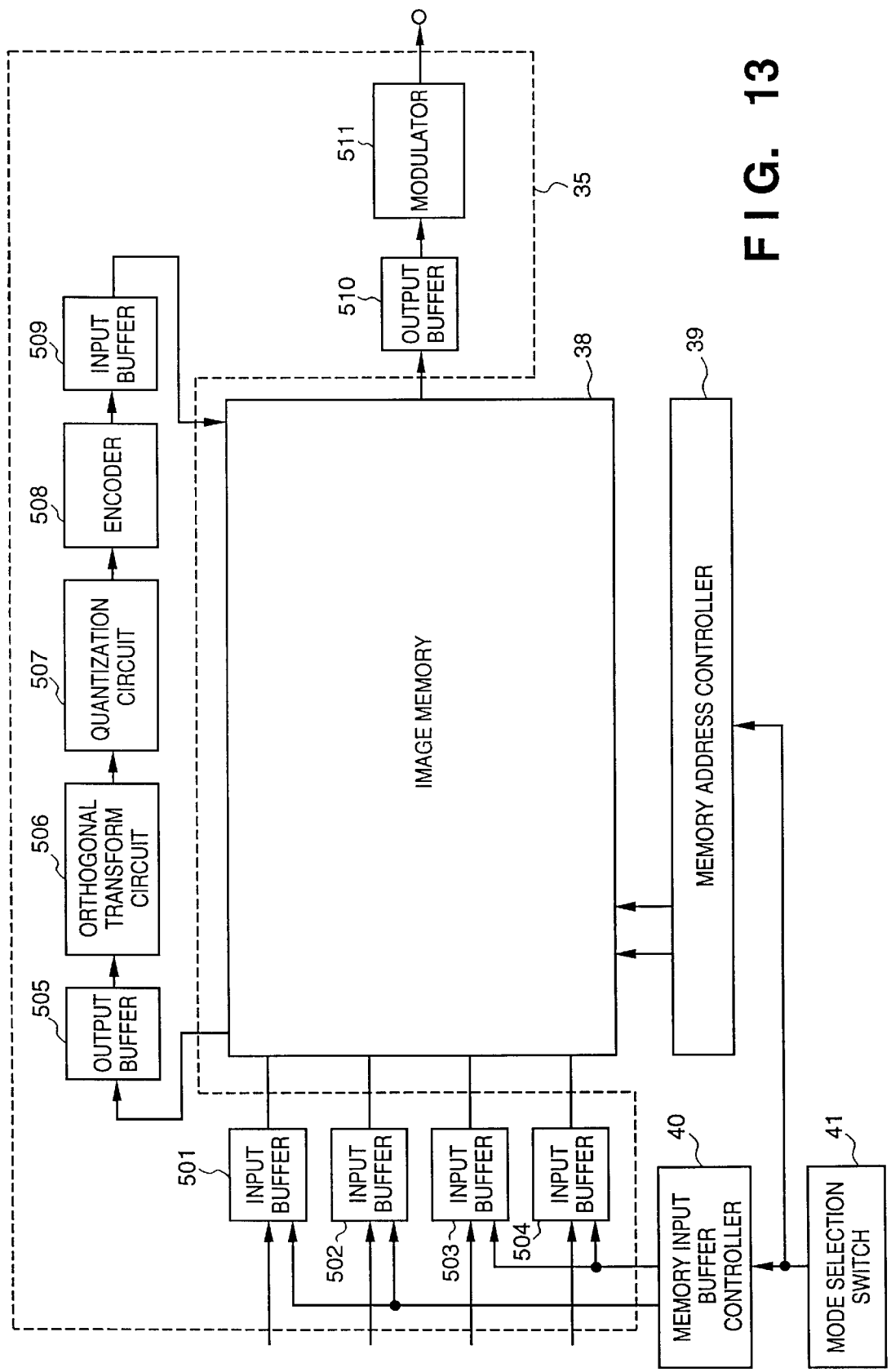
FIG. 13 is a block diagram illustrating a configuration of a video signal processing circuit.

FIG. 13 is a block diagram illustrating a configuration of the video signal processing circuit 35.

In FIG. 13, reference numerals 35, 38, 39, 40 and 41 denote the same element as those in FIG. 10.

Reference numerals 501 to 504 and 509 denote input buffers used for writing data to image memory 38; 505 and 510, output buffers used for reading data from the image memory 38; 506, an orthogonal transform circuit for performing discrete cosine transform (DCT) and the like; 507, a quantization circuit; 508, encoder; and 511, a modulator.

Next, an operation of the video signal processing circuit 35 having the aforesaid configuration will be explained.

When the still image recording mode is selected by the mode selection switch 41, two streams of video signals (luminance signals Y and time division multiplexed color difference signals) outputted by field from the camera signal processing circuit 34 are inputted to the video signal processing circuit 35. A still image recording mode signal outputted from the mode selection switch 41 enters the memory input buffer controller 40. The memory input buffer controller 40 controls the input buffers 501 to 504 so as to write data sensed at the same timing, namely, data of two fields inputted as Y1, C1, Y2 and C2 at the same timing, into the image memory 38.

Further, the still image recording mode signal is also inputted to the memory address controller 39, and write addresses are controlled so that single frame data is generated from data of two field inputted as Y1, C1, Y2 and C2 at the same timing. Read addresses are given so that luminance signals Y and color difference signals in the frame data is divided into blocks, then block data is read out from the frame data in a predetermined order (shuffling).

The block data read out from the image memory 38 is applied with orthogonal transform, such as DCT, by block by the orthogonal transform circuit 506, and coefficient data of the orthogonal transform is outputted. The coefficient data resulted from the orthogonal transform is quantized based on predetermined quantization coefficients in accordance with the skew of the coefficient data resulted from the orthogonal transform, so that, when the recorded data is applied with inverse transform and decoded, the obtained data is not much deteriorated. The quantization data is inputted to the encoder 508 where zigzag scanning and encoding by Huffman coding, for example, are performed for reducing the amount of data in each block.

The encoded data is written to the image memory 38 again, and, and read out from the image memory 38 so that the shuffled encoded data are de-shuffled for rearranging it into the original arrangement of the frame data. The de-shuffled image data is modulated into a form suitable for recording by the recording circuit 36, so as to be written and read in high precision.

When the moving image recording mode is selected by the mode selection switch 41, two streams of video signals (luminance signals Y and time division multiplexed color difference signals), outputted from the camera signal processing circuit 34, by field are inputted to the video signal processing circuit 35. A moving image recording mode signal outputted from the mode selection switch 41 enters the memory input buffer controller 40. The memory input buffer controller 40 controls the input buffers 501 to 504 so as to write image data of consecutive two fields sensed at different image sensing timing, namely, consecutive two fields of signals, (Y1, C1) or (Y2, C2), into the image memory 38.

In a case where the field data of (Y1, C1) is used, the input buffers 503 and 504 may be constructed as either one of the following. ① Receive a signal for turning off the power of the input buffers 503 and 504 from the memory input buffer controller 40. ② The input buffers 503 and 504 are configured to turn on and off in response to a clock signal which is controlled in accordance with an output signal from the memory input buffer controller 40, and when the clock signal is not inputted to the input buffers 503 and 504, in this case, and the input buffers 503 and 504 turn off.

The input buffers 501 to 504 are controlled by the memory input buffer controller 40 in one of the aforesaid methods and ① and ②.

Furthermore, the moving image recording mode signal is also inputted to the memory address controller 39, and write addresses are controlled so that frame data is generated from data of two consecutive fields inputted from one output terminal (Y1 and C1 in the above example).

Further, read addresses are given so that luminance signals Y and color difference signals in frame data are divided into blocks, then block data is read out from the frame data in a predetermined order (shuffling). The processes, such as orthogonal transform, quantization, encoding and modulation, performed after the data is read by shuffling are the same as those in the still image recording mode.

FIGS. 14A and 14B are block diagrams illustrating control circuits for controlling the input buffers 501 to 504. FIG. 14A is a block diagram of the control circuit for realizing the method ①, and FIG. 14B is a block diagram of the control circuit for realizing the method ②. Reference numerals 512 and 513 in FIG. 14A denote power controller, and reference numerals 514 and 515 in FIG. 14B denote clock gates. When the field data outputted from the terminal (Y1, C1) is used as in the above example, power (FIG. 14A) or clock (Fig. 14B) which passed the gate is inputted to the input buffers 501 and 502. At this time, the power controllers 512 and 513 or the clock gates 514 and 515 operate so that power or clock is not inputted to the input buffers 503 and 504.

According to the third embodiment as described above, when a moving image is sensed and recorded by using a non-interlace scanning type image sensing element which is capable of reducing notches on edges and deterioration of resolution in the vertical direction upon sensing a still image, it is possible to Avoid wasteful processing of imag e signals. Thereby, it is possible to reduce power consumption, and when a battery is used for driving the image sensing apparatus, the battery life can be extended with the aforesaid configuration.

Note, a CCD which outputs signals by two horizontal lines (an odd line and an even line) is used in the third embodiment, however, the present invention is not limited to this. For example, it is also possible to use a CCD which outputs signals by a single horizontal line e to obtain two streams of signals by separating the output signals into field signals of odd lines and field signals of even lines.

<Fourth Embodiment>

In the fourth embodiment, a case where a non-interlace scanning type CCD is applied to an image sensing apparatus of NTSC standard will be explained. For generating video signals for television standard, image signals of even lines are used to generate the first field and image signals of odd lines are used to generate the second field; or image signals of two adjacent lines are combined to form the first field and image signals of two different adjacent lines are combined to form the second field. In the similar manner, image signals of the subsequent fields are sequentially generated, applied with predetermined image processes, and outputted as video signals of various kinds of television standards. This operation is performed under image sensing mode A.

Next, in order to generate a still image, all the image data of a frame outputted by the non-interlace scanning type CCD is processed and outputted, thereby resolution in the vertical direction is maintained 100%. This operation is performed under image sensing mode B.

Furthermore, either the image sensing mode A or B is selected in accordance with image sensing conditions. More specifically, when sensing a moving image, the image sensing mode A is set, and when an operator desires to sense a still image or when an object to be sensed is a perfect still life as in a case of sensing a negative film to generate an positive image, the image sensing mode B is set in accordance with an external control.

Figure 15:
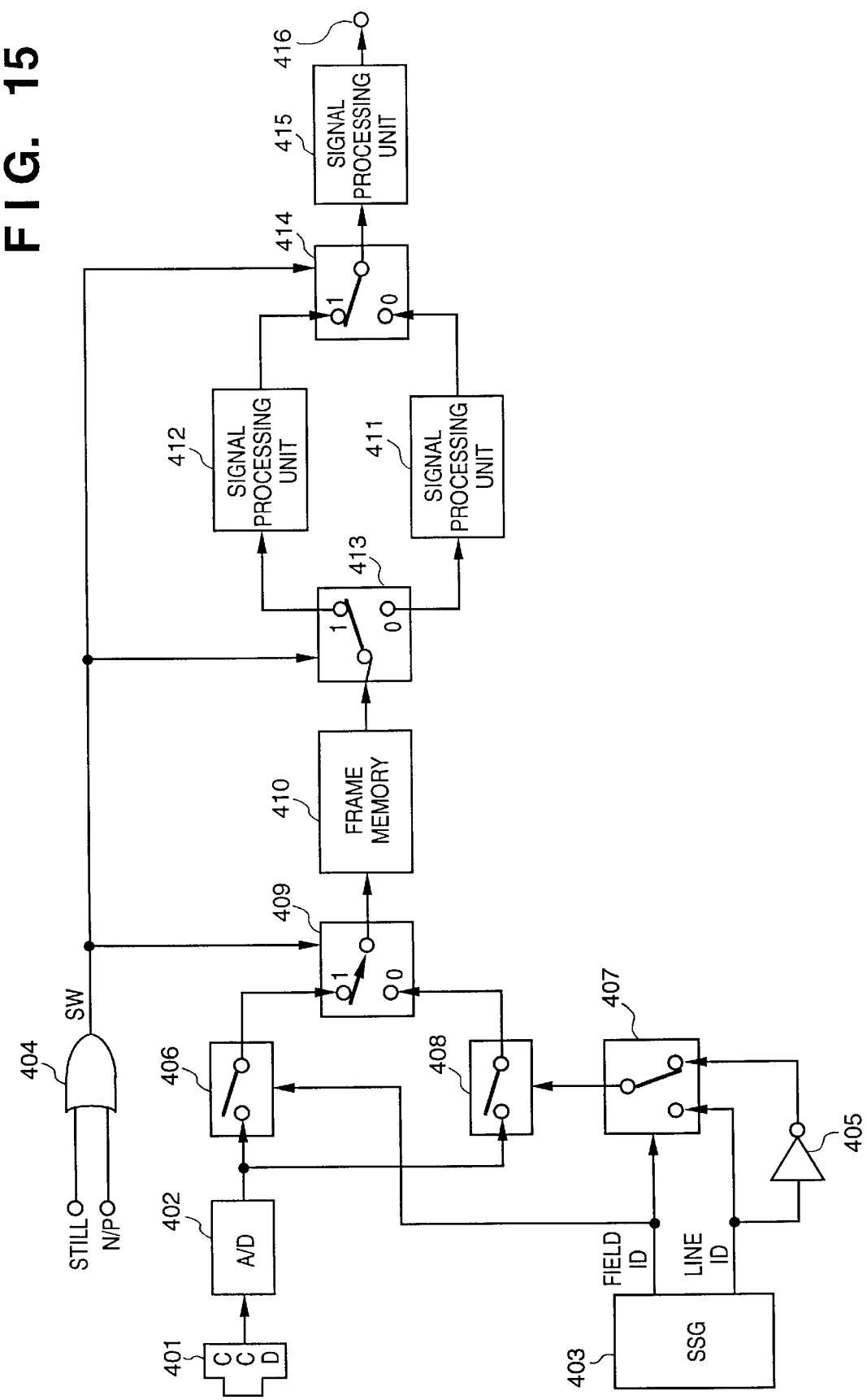
FIG. 15 is a block diagram illustrating a configuration of an image sensing apparatus according to a fourth embodiment of the present invention.

FIG. 15 is a block diagram illustrating a configuration of an image sensing apparatus according to the fourth embodiment of the present invention.

Referring to FIG. 15, reference numeral 401 denotes a non-interlace scanning type CCD; 402, an A/D converter; and 403, a synchronization signal generator (SSG) which outputs a field identification (ID) signal or a line identification (ID) signal. Further, reference numeral 404 denotes an OR gate to which a control signal STILL used to sense a still image and a control signal N/P used to sense a negative-positive sensing input, and which outputs a switching signal SW. Reference numeral 405 denotes an inverter for inverting the line ID signal; 406, a gate, controlled by the field ID signal, to which the output from the A/D converter 402 is inputted; 407, a switch for switching between the line ID signal and the output from the inverter 405 in accordance with the control of the field ID signal; 408, a gate, controlled by the output from the switch 407, to which the output from the A/D converter is inputted; and 409, a switch for switching between the output from the gate 406 and the output from the gate 408 in accordance with the SW signal.

Further, reference numeral 410 denotes a frame memory for storing the output from the switch 409; 411, a signal processing unit used under the image sensing mode A; 412, a signal processing unit used under the image sensing mode B; 413, a switch which inputs the output from the frame memory 410 to either the signal processing unit 411 or 412 in accordance with the SW signal; 414, a switch for switching between the outputs from the signal processing units 411 and 412 in accordance with the SW signal; 415, a signal processing unit for processing the output from the switch 414; and 416, an output terminal.

Next, an operation of the fourth embodiment will be described with reference to FIGS. 15 and 16.

From the non-interlace scanning type CCD 401, image signals of all of the light receiving pixels are read at the rate of 60 frames/sec which is two times faster than a conventional CCD from which added image signals are outputted. The read image signals are converted into digital image signals by the A/D converter 402. In a case of sensing an object in the image sensing mode A, both of the STILL signal and the N/P signals become LOW. Accordingly, the SW signal outputted from the OR gate 404 becomes LOW, too, thereby the switches 409, 413 and 414 are connected to terminals 0 (refer to FIG. 15). Meanwhile, the SSG 403 outputs the field ID signal and the line ID signal at timing shown in a timing chart in FIG. 16. More specifically, the field ID signal complements every $\frac{1}{60}$ second, and the line ID signal complements every line.

Figure 16:
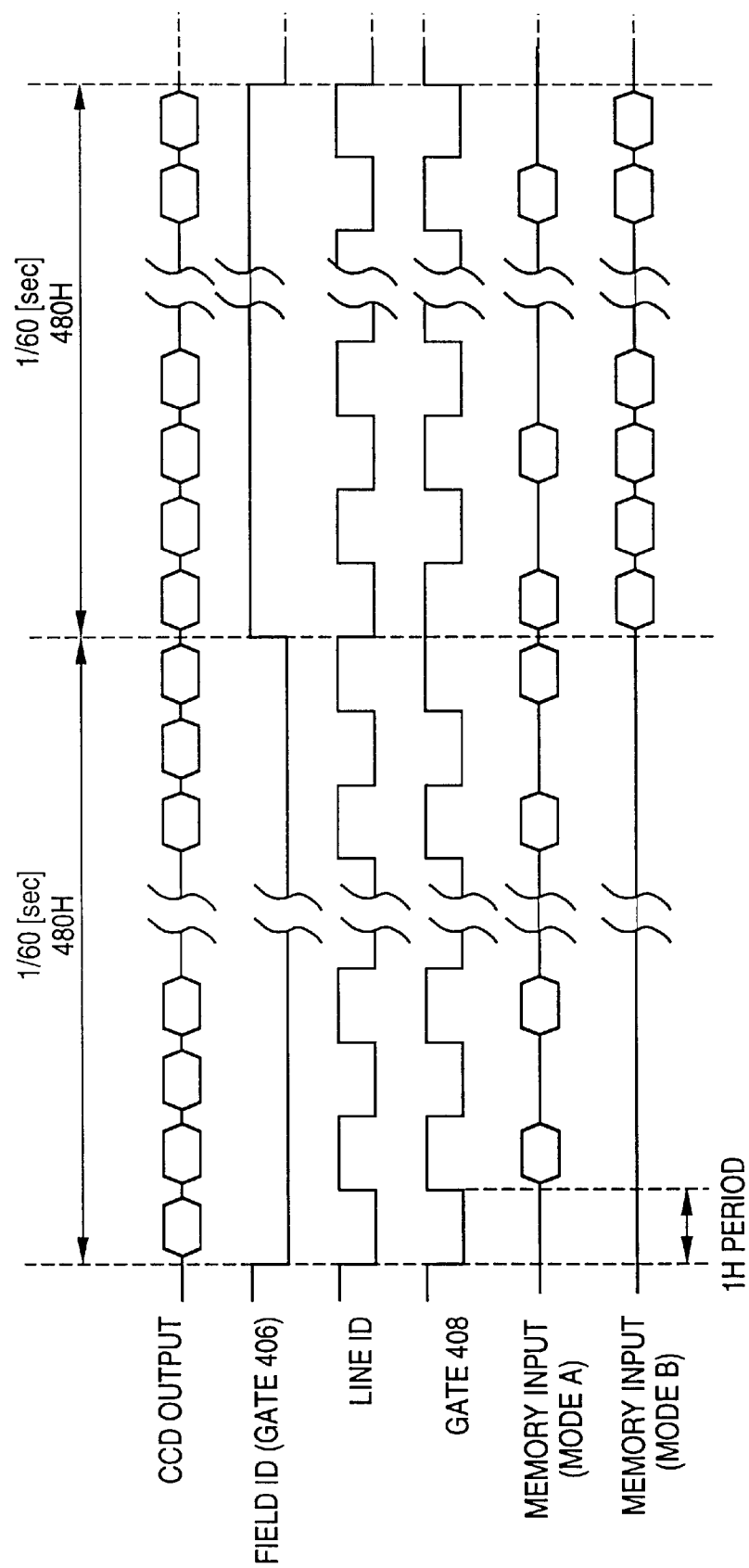
FIG. 16 is a time chart representing an operation of the fourth embodiment.

Therefore, the gate 408 which controls the signal to be inputted to the terminal 0 of the switch 409 operates as shown in FIG. 16. Accordingly, regarding write operation of the output from the CCD 401 to the frame memory 410, when image signals of a first frame are to be obtained from the CCD 401 (1 field period), the signals of the even lines are written, and when image signals of the next frame are to be obtained from the CCD 401, the signals in the odd lines are written as shown in "memory input (mode A)" in FIG. 16. Then, every other line of image signals from the CCD 401 written to the frame memory 410 are read out of the frame memory 410, thus interlaced image signals can be obtained at the rate of 60 fields/sec.

In a case of sensing in the image sensing mode B, either the STILL signal or the N/P signal becomes HIGH. Accordingly, the SW signal becomes HIGH and the switches 409, 413 and 414 are connected to the terminals 1. Further, as shown in "field ID (gate 406)" in FIG. 16, the gate 406 is controlled by the field ID signal. As a result, as shown in "memory input (mode B)" in FIG. 16, when the first frame is to be obtained from the CCD 401 in 1 field period, it is not written in the frame memory 410, and when the next frame is to be obtained from the CCD 401, all the outputs from the CCD 401 are written. Then, by reading the written data out of the frame memory 410 sequentially, the non-interlaced image signals are obtained.

In the image sensing mode A, output from the CCD 401 written in the frame memory 410 is sent to the signal processing unit 411, and sent to the signal processing unit B when the image sensing mode B is selected. This is because correlation distance in the vertical direction differs in the image sensing mode A from that in the image sensing mode B, and processes which depends upon the correlation distance in the vertical direction, such as color separation and vertical outline correction, are necessary performed depending upon the image sensing mode. Thereafter, processes, such as γ correction, white balance correction and clamping, are commonly performed in the signal processing unit 415 regardless of the selected image sensing mode A or B, and the processed signals are outputted from the output terminal 416. In this case, the signal processing unit 415 outputs moving image signals, such as NTSC standard video signals, in the image sensing mode A, and outputs image signals of an arbitrarily frame as high quality still image signals in the image sensing mode B.

According to the fourth embodiment as described above, in a case of sensing a moving image, moving image signals, such as video signals of various kinds of television standards, are outputted and can be displayed on a television standard monitor. Further, in a case of outputting sensed image signals to a media other than a device of a television standard, and in a case of sensing a still image, it is possible to obtain a still image of high quality which is suitable for the media.

<Modification of the Fourth Embodiment>

Figure 17:
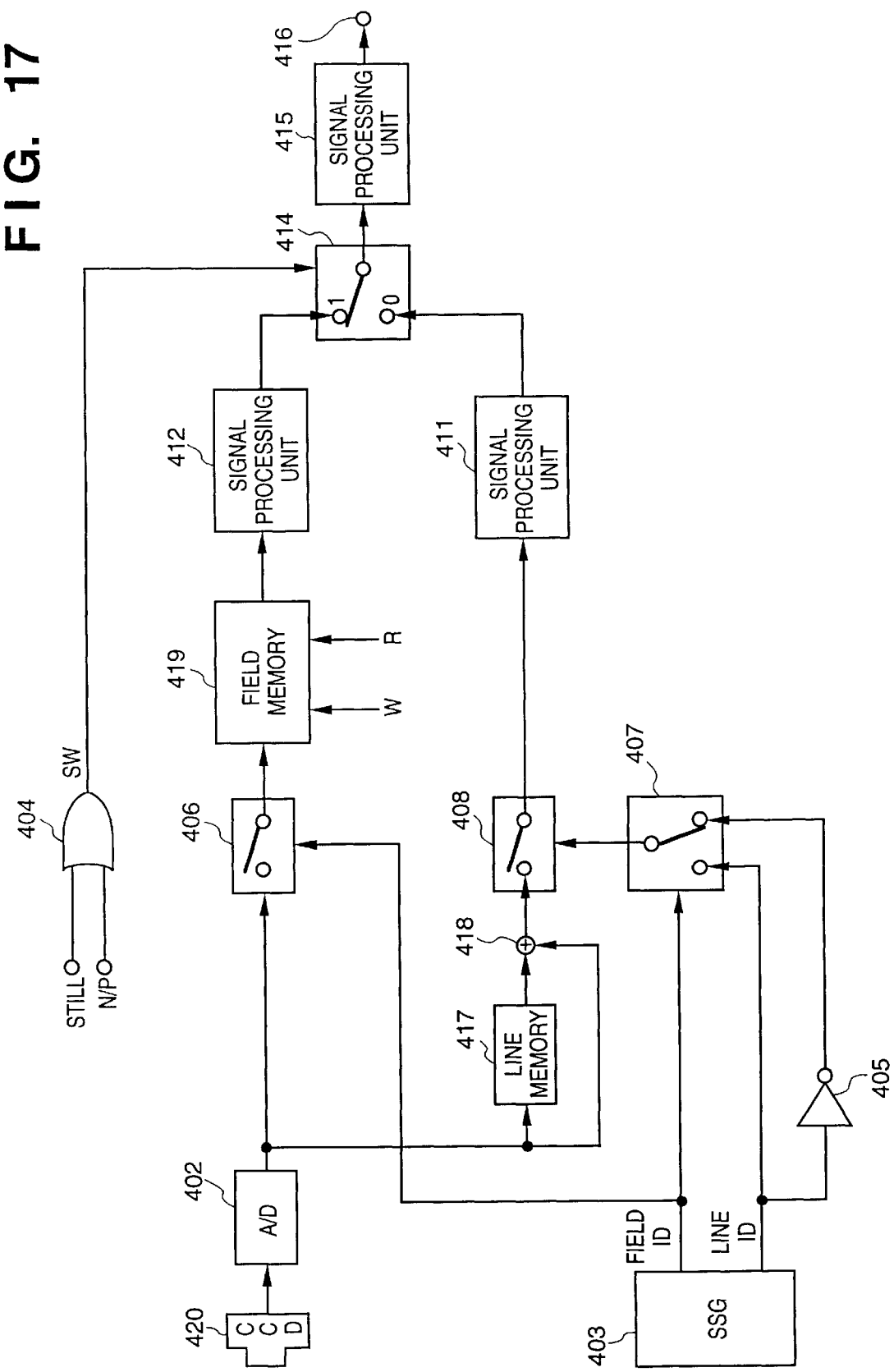
FIG. 17 is a block diagram illustrating a configuration of an image sensing apparatus according to a modification of the fourth embodiment of the present invention.

FIG. 17 is a block diagram illustrating a configuration of an image sensing apparatus according to a modification of the fourth embodiment of the present invention. FIG. 17 also shows a case where the present invention is applied to an image sensing apparatus of NTSC standard.

In FIG. 17, reference numeral 420 denotes a non-interlace scanning type CCD with a complementary color mosaic filter; 417, a line memory for delaying the output from the A/D converter for 1H period; 418, an adder for adding the analog-digital converted signal and the delayed output signals then inputting the sum to the gate 408; and 419, a field memory for storing the output from the gate 406 and sending it to the signal processing unit 412. In FIG. 17, the units and element as those in FIG. 15 are referred by the same reference numerals and the explanation of those are omitted.

Figure 18:
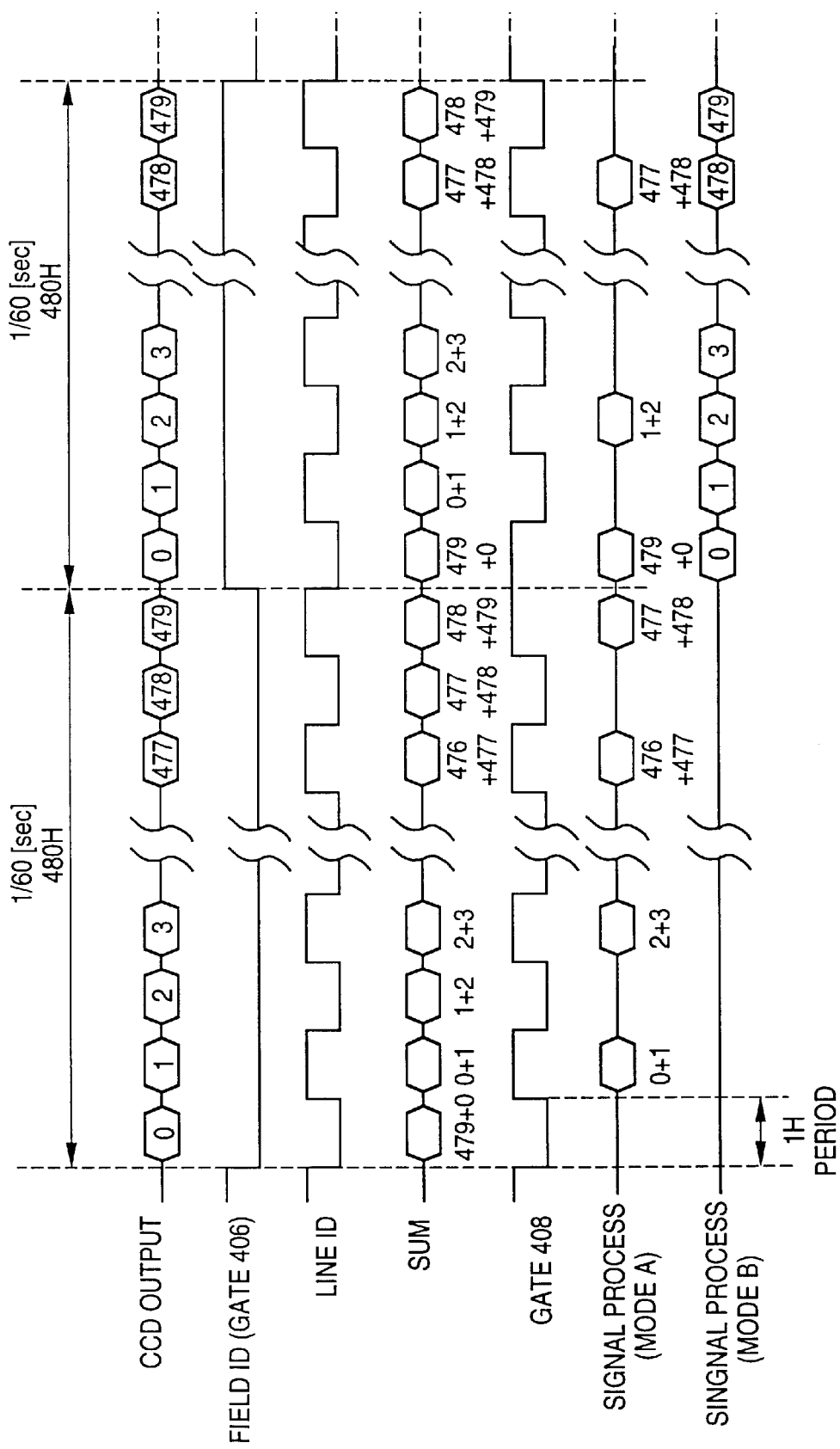
FIG. 18 is a time chart representing an operation of the modification of the fourth embodiment.

Next, an operation of the image sensing apparatus having the aforesaid configuration will be described below with reference to FIGS. 17 and 18.

From the non-interlace scanning type CCD 420, image signals are read at the rate of 60 frames/sec, and converted into digital image signals by the A/D converter 402. The digital image signals are added to digital signals of one former horizontal line outputted from the line memory 417, thereby the "sum" shown in FIG. 18 is obtained. This sum is sent to the gate 408. The field ID signal generated by the SSG 403 complements every field as shown in FIG. 18, and the line ID signal complements every line as shown in FIG. 18. The gate 408 is controlled in accordance either with the line ID signal selected by the switch 407 which is controlled in accordance with the field ID signal or with an inverted line ID signal inverted by the inverter 405, and performs as shown in FIG. 18. Accordingly, the CCD signals transmitted to the signal processing unit 411 is as "signal process (mode A)" in FIG. 18. These signals correspond to ordinary signals obtained by a conventional CCD which adds two adjacent lines.

Meanwhile, the digital image signals outputted from the A/D converter 402 are also given to the gate 406. The gate 406 is controlled as shown in "field ID (gate 406) in FIG. 18, and does not pass the signals in the first frame then transmits the signals to the field memory 419 in the next frame as shown in "signal process (mode B)" in FIG. 18. The field memory 419 simultaneously controls to write and read to/from the memory in accordance with a write control signal W and a read control signal R. By having the frequency of the write control signal W being two times as high as the frequency of the read control signal R, signals of a single frame outputted from the CCD 420 are buffered by the field memory 419 and transmitted to the signal processing unit 412.

As described above, signals of interlaced two frames, namely, of a single frame outputted from the CCD 420 are transmitted to the signal processing unit 412. The respective signal processing units 411 and 412 perform different processes which depend upon correlation distance in the vertical direction, such as color separation and outline correction in the vertical direction. This is because signals inputted into the signal processing unit 411 are interlaced signals corresponding to signals scanned by adding two adjacent lines, and signals inputted into the signal processing unit 412 are non-interlaced and non-added signals, thereby the correlation distances in the vertical direction of the former signals differs from the latter signals. In addition, color information of each pixel differs between the former signals and the latter signals, thus a matrix operation unit for color reproduction is also provided in each of the signal processing units 411 and 412.

Note, in a case of sensing in the image sensing mode A, both, the STILL signal and the N/P signal become LOW. Therefore, the SW signal also becomes LOW, and the switch 414 is connected to the terminal 0, thus interlaced image signals corresponding to signals scanned by adding two horizontal lines are transmitted to the signal processing unit 415. Further, in a case of sensing a still image or sensing by negative-positive conversion in the image sensing mode B, since either the STILL signal or the N/P signal becomes HIGH, the SW signal also becomes HIGH and the switch 414 is connected to the terminal 1. Therefore, non-interlaced and non-added image signals are transmitted to the signal processing unit 415. The signal processing unit 415 performs processes, such as γ correction, white balance correction and clamping, which can be commonly applied to the signals sensed both in the image sensing modes A and B, and the processed signals are outputted from the output terminal 416. In this case, the signal processing unit 415 outputs moving image signals, such as NTSC standard video signals, in the image sensing mode A, and outputs image signals of an arbitrary frame as a high quality still image signals in the image sensing mode B.

According to the modification of the fourth embodiment as described above, it is possible to achieve the same advantages as those in the fourth embodiment in a case of sensing a color image.

<Fifth Embodiment>

An image sensing apparatus according to a fifth embodiment of the present invention will be described with reference to drawings.

Figure 19:
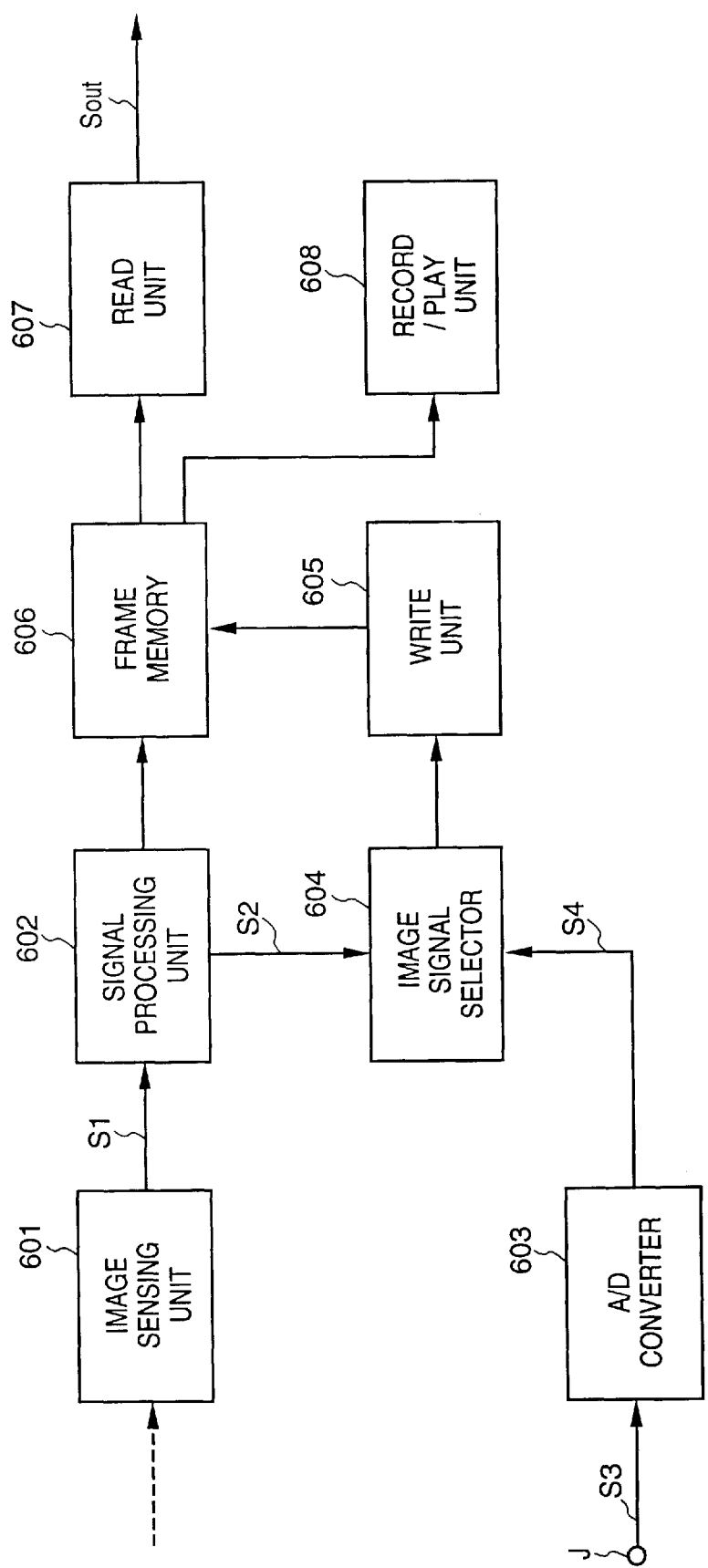
FIG. 19 is a block diagram illustrating main elements of an image sensing apparatus according to a fifth embodiment of the present invention.

FIG. 19 is a block diagram illustrating a main part of an image sensing apparatus according to the fifth embodiment of the present invention. In FIG. 19, reference numeral 601 denotes an image sensing unit; 602, a signal processing unit; 603, an A/D converter; 604, an image signal selector; 605, a write unit; 606, a frame memory; 607, a read unit; and 608, a record/play unit.

The image sensing unit 601 sequentially outputs signals to be written in the frame memory 606 by non-interlace scanning.

The signal processing unit 602 applies predetermined processes to non-interlaced signals S1 outputted from the image sensing unit 601, generates digital image signals based on the non-interlaced signals S1 (referred as "digital camera input image signals", hereinafter), S2, and outputs them.

The A/D converter 603 is for converting analog image signals inputted via a signal input terminal J (referred as "analog line input image signals", hereinafter), S3, into digital image signals (referred as "digital line input image signals", hereinafter) S4.

The image signal selector 604 is for selecting either the digital camera input image signals S2 outputted from the signal processing unit 602 or the digital line input image signals S4 outputted from the A/D converter 603, and outputting the selected image signals.

The write unit 605 is for writing the selected image signals, S2 or S4, selected by the image signal selector 604 into the frame memory 606.

The read unit 607 is for, when the digital camera input image signals S2 are written to the frame memory 606 in the non-interlace form, reading the digital camera input image signals S2 in an interlace form and outputting the read signals as a standard television signals $S_{OUT}$ to an external device.

The record/play unit 608 compresses and encodes image data stored in the frame memory 606 and records it to a recording medium, reads the recorded data, and reproduces, expands, decodes, and outputs the obtained image signals.

According to the image sensing apparatus as described above, when the digital camera input image signals S2 are written to the frame memory 606 in the non-interlace form, the read unit 607 reads out the written image signals in the interlace form from the frame memory 606 and outputs to an external device. Thereby, it is possible to generate standard television signals $S_{OUT}$ by frame by using throughout image data included in one frame outputted from the image sensing unit 601 in non-interlaced form.

Accordingly, upon sensing a moving object or sensing an object while panning the image sensing apparatus, by combining two fields of standard television signals $S_{OUT}$ which are obtained by reading the stored image signals from the frame memory 606 in the interlace form, it is possible to record a high-quality still image without notches and blurring on edges as well as monitor an image under recording or an image to be recorded on an electronic view finder (EVF) or a general television display.

Further, the standard television signals $S_{OUT}$ can be generated by reading out from the frame 606 by the read unit 607 without processed by the record/play unit 608, thus, when the signals are not necessarily to be recorded, a high quality image which is not deteriorated by processes, such as compression by the record/play unit 608, for example, can be directly outputted. Therefore, it is also possible to print out a high quality still image by using these output signals. Note, the read unit 607 which reads out image signals in the interlace form from the frame memory 606 may be controlled not to operate when recording the image signals. By doing so, it is possible to print out or monitor a still image without using a high-speed access memory.

Details of the image sensing apparatus according to the fifth embodiment will be explained with reference to drawings. FIG. 20 is a block diagram illustrating a configuration of the image sensing apparatus according to the fifth embodiment. In FIG. 20, reference numeral 701 denotes a CCD outputting non-interlaced image signals by sequentially scanning pixels by non-interlace scanning.

A camera signal processing unit 702 is for performing processes, such as analog-digital conversion, γ correction, clipping and transformation into luminance and color difference signals, on the non-interlaced image signals outputted from the CCD 701.

Reference numeral 703 denotes an A/D converter for converting line input from an external device into digital signals, and reference numeral 704 denotes a switch for switching between the outputs from the camera signal processing unit 702 and the outputs from the A/D converter 703.

Reference numeral 705 denotes a recording processing unit for compressing and encoding digitized image signals and recording them on a magnetic tape 707; and 706, a frame memory used by the recording processing unit 705 and a reproduction processing unit 708 which will be explained later.

Reference numeral 707 denotes the magnetic tape for recording the image signals compressed and encoded by the recording processing unit 705; 708, the reproduction processing unit for reading out the recorded image signals as well as performing expansion and decoding; 709, a switch for selectively switching between the reproduced image signals outputted from the reproduction processing unit 708 and input image signals; and 710, a D/A converter for digital-analog converting digital image signals outputted from the switch 709 to obtain a line output.

Further, reference numeral 711 denotes an EVF for monitoring image signals to be outputted as the line output; 712, digital camera input image signals after applied with predetermined processes by the camera signal processing unit 702; 713, digital line input image signals which are obtained by analog-digital converting analog line input image signals; 714, input image signals selected by the switch 704; and 715, monitor signals for confirming the digital camera input image signals.

Next, an operation of the image sensing apparatus configured as described above according to the fifth embodiment will be explained. First, image signals of are sequentially outputted by frame from the CCD 701 at the rate of 30 frames/second, and enter the camera signal processing unit 702.

Thereafter, the image signals are converted to the digital camera input image signals 712 by the camera signal processing circuit 702, and enter the switch 704.

Further, in a case where image signals are inputted from an external device, the input image signals enter the A/D converter 703, then enter the switch 704 as digital line input image signals 713.

Figures 21A, 21B:
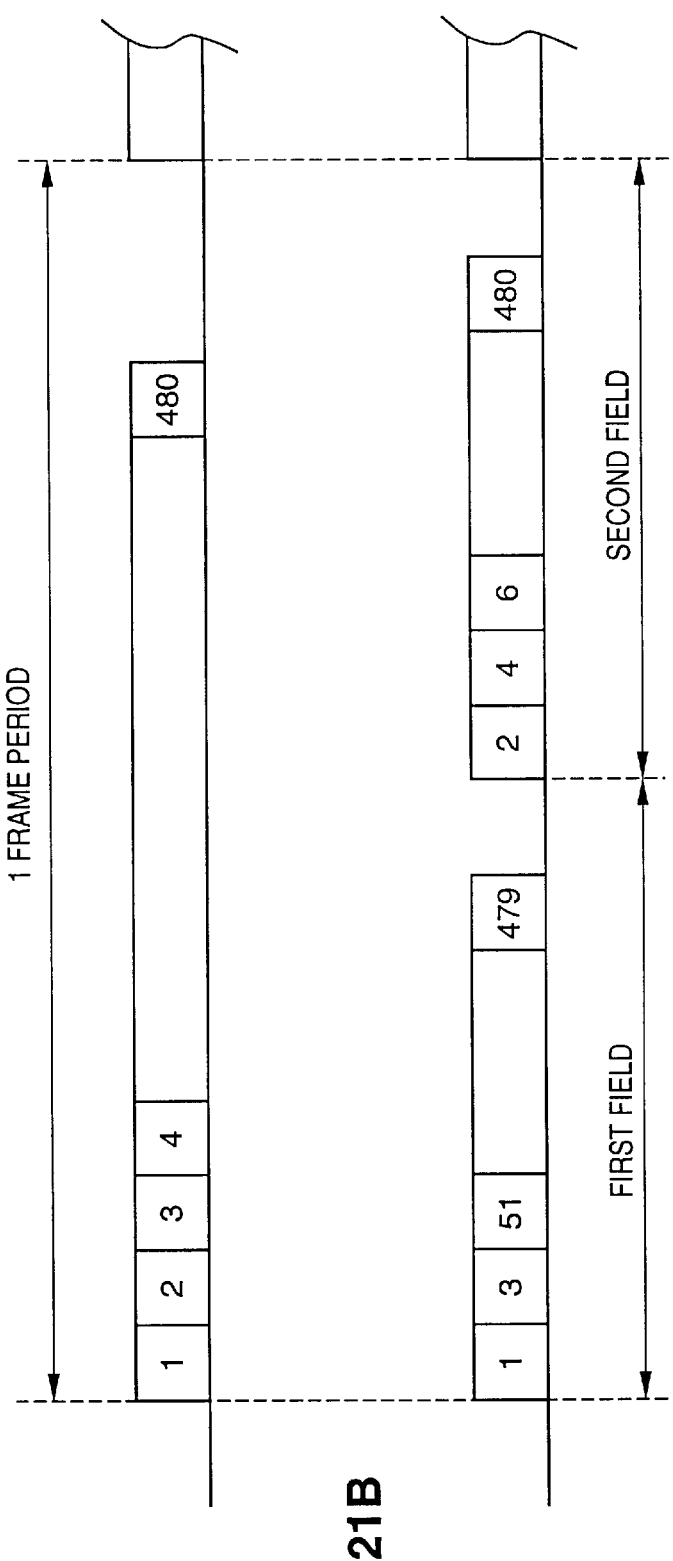
FIGS. 21A and 21B are explanatory views for explaining signal forms.

These two kinds of input image signals are shown in FIGS. 21A and 21B. FIG. 21A shows the digital camera input image signals 712 inputted from the camera signal processing unit 702 and all the image signals of a frame, i.e., from the first line to the 480-th line, are sequentially read out by non-interlace scanning in a frame period ($\frac{1}{30}$ seconds).

FIG. 21B shows the digital line input image signals 713 inputted from an external device. The digital line input image signals 713 are general television standard signals which are in the interlaced form.

More specifically, regarding the digital line input image signals, image signals of odd lines (i.e., odd lines among first to 479-th lines) are transmitted in a field period ($\frac{1}{60}$ seconds), then the remaining image signals of even lines (i.e., even lines among second to 480 lines) are transmitted in the next field period. Note, periods which do not contain any signal in FIGS. 21A and 21B are blanking periods.

Either the digital camera input image signals 712 or the digital line input image signals 713 inputted to the switch 704 are selected by the switch 704, and the selected image signals are outputted to the recording processing unit 705. The recording signal processing unit 705 writes the selected image signals of a frame to the frame memory 706, then reads out the image signals by block of 8×8 pixels, for example. Thereafter, the read image signals are processed with DCT, variable-length coding, addition of an error correction code, modulation for recording, and so on, then recorded on the magnetic tape 707.

Note, it is necessary to read out blocks of image data at spread positions in a frame from the frame memory 706 in order to perform encoding efficiently (shuffling). Therefore, the frame memory 706 must have the storage capacity of two frames.

More specifically, while the selected image signals 714 are written to the first frame storage area (bank 0) of the memory 706, an image of a frame which is stored in the second frame area (bank 1) is read out by shuffling. The image stored in the bank 1 is read out before the next frame period starts, and the bank 1 becomes empty. Thereafter, other image signals of a frame are written in the bank 1 in the next frame, and the image signals which have been written in the bank 0 in the prior frame period are read out by shuffling. The aforesaid operation is repeated.

When image signals written in the magnetic tape 707 are read out, the reproduction processing unit 708 performs operation which is opposite to the recording operation. At this time, the frame memory 706 is used as a reproduction memory by being disconnected from the units used for recording operation.

The image signals, which are digital signals, reproduced by the reproduction processing unit 708 enter the D/A converter 710 via the switch 709, and converted into analog image signals by the D/A converter 710. Thereafter, the analog image signals are outputted to an external device or provided to an EVF to be displayed, for example.

The switch 709 is for switching between the reproduced image signals, selected image signals 714 and the monitor image signals 715, and it will be fixed to a terminal c when reading from the magnetic tape 707, and fixed to either a terminal a or a terminal b when recording or otherwise.

Note, in a conventional image sensing apparatus, it is basically necessary to input one stream of signals corresponding to an input image to the switch 709. However, since the image signals from the camera signal processing unit 702 (image signals read from the CCD 701) are not interlaced signals in the fifth embodiment, the selected image signals 714 which are inputted to the switch 709 can not be always displayed directly on a general monitor or an EVF.

Thus, when the image signals sensed by the CCD 701 are selected, an operation in which the recording processing circuit 705 reads out the selected image signals, written in the frame memory 706, in the interlace form is performed, and the read image signals are inputted to the terminal b of the switch 709, thereby the monitor signals 715 can be watched. Note, regarding the reproduced signals, they are always read out as interlaced signals regardless of the format of the recorded signals, thus the above problem does not occur.

Figure 23:
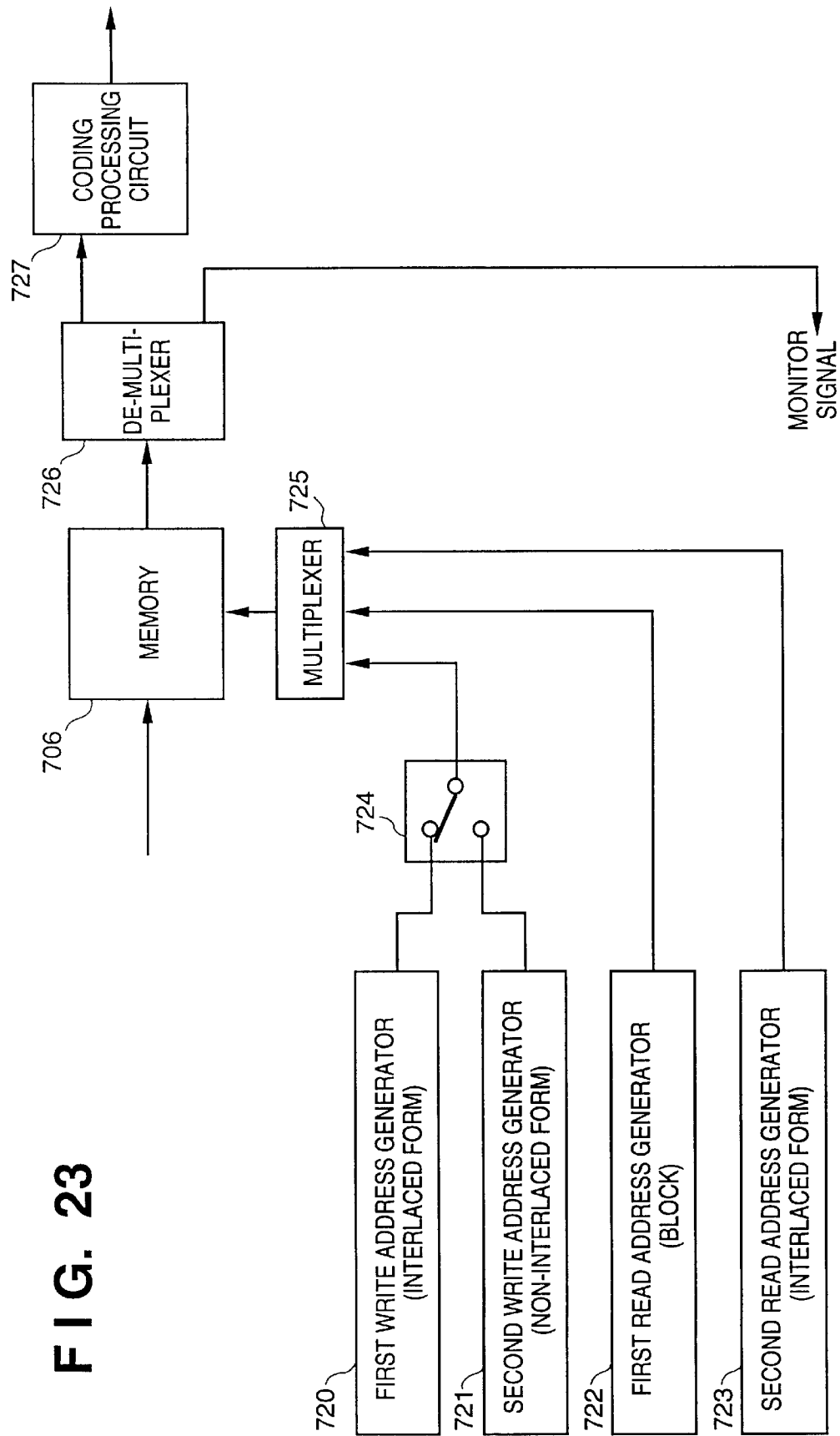
FIG. 23 is a block diagram illustrating a first internal configuration of a recording signal processing unit and a memory shown in FIG. 20.

FIG. 23 is a block diagram illustrating an internal configuration of the recording signal processing unit 705 and the frame memory 706. In FIG. 23, reference numeral 720 denotes a first write address generator (interlaced form); 721, a second write address generator (non-interlaced form); 722, a first read address generator (block); and 723, a second read address generator (interlaced form).

A switch 724 is for selecting either the output from the first write address generator 720 or the output from the second write address generator 721.

A multiplexer 725 is for selecting one of the output signals from the switch 724, from the first read address generator 722 and from the second read address generator 723.

A de-multiplexer. 726 is for branching signals from the frame memory 706 into signals to be inputted into a coding processing unit 727 and monitor signals.

The coding processing unit 727 performs processes such as compression, encoding, error correction and demodulation on signals outputted from the de-multiplexer 726.

The first write address generator 720 and the second write address generator 721 respectively generates addresses for the line input image signals and the camera input image signals. Then, one of the above addresses are selected by the switch 724 in accordance with the kind of the image signals to be stored in the frame memory 706.

Further, the first read address generator 722 generates shuffling and block addresses for encoding and recording, and the second read address generator 723 generates interlaced addresses used for reading out image signals from the frame memory 706 as the monitor signals.

These three addresses are supplied to the memory 706 via the time division multiplexer 725, and write operation to the frame memory 706 or read operation from the frame memory 706 is performed in accordance with each address.

In the fifth embodiment, since two kinds of addresses (block for recording and interlaced form for monitor signals)

are inputted from the two read address generators 722 and 723, the read out data are separated into data to be fed to the coding processing circuit 727 and data of monitor signals by the de-multiplexer 726.

Figure 24A:
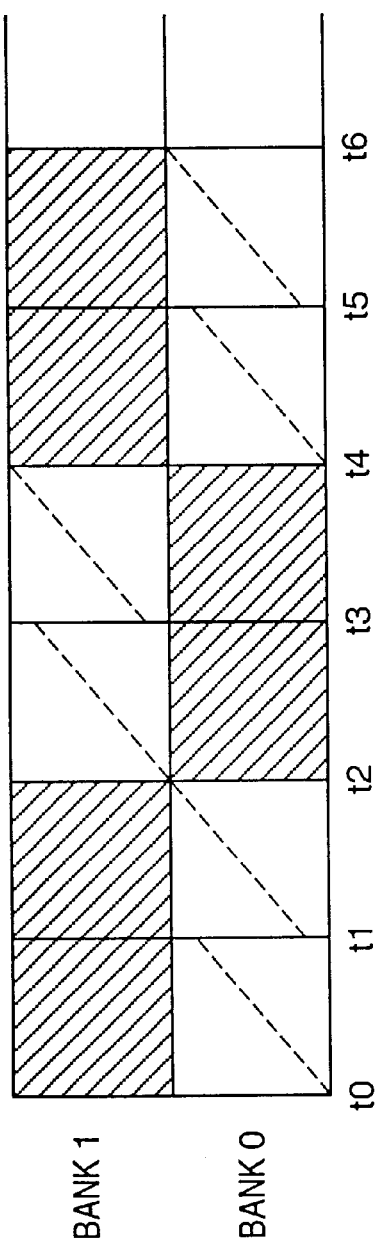
FIGS. 24A and 24B are explanatory views showing operation on the memory in the first internal configuration shown in FIG. 23.
Figure 24B:
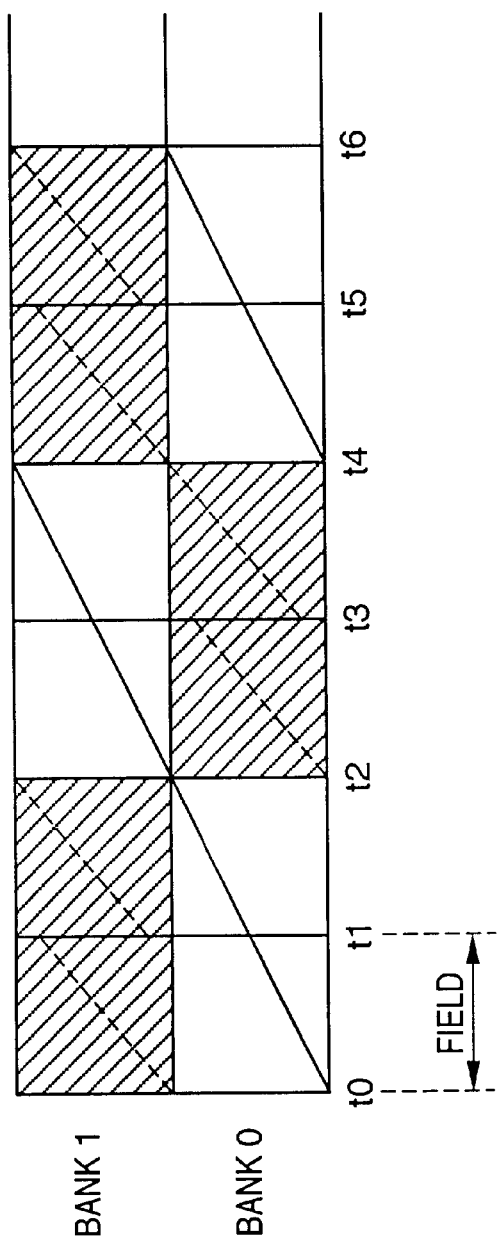

The aforesaid operations on the memory are shown in FIGS. 24A and 24B. FIG. 24A shows a case of line input (image signals are inputted from an external device), and FIG. 24B shows a case of camera input (image signals are obtained by the CCD 701). In FIGS. 24A and 24B, the horizontal axis shows time, and t0, t1, . . . show time by field.

Further, the vertical axis shows addresses of the frame memory 706 having the capacity of storing image signals of two frames in the two banks, the bank 0 and the bank 1.

FIG. 24A will be explained first. While input signals are written in the bank 0 during a frame period between t0 and t2, data which is shuffled and divided into blocks for encoding is read out from the bank 1.

In FIG. 24A, the addresses of the shuffled data are expressed with an oblique stripe pattern. Note, the reason why the addresses in the bank 0 is expressed with broken lines is that the input signals are in interlaced form and only the signals of odd lines are written in the first field period between t0 and t1, and only the signals of even lines are written in the second field period between t1 and t2. Then, in the next frame period between t2 and t4, the banks are switched and the similar write and read operations are performed on the banks.

Whereas, referring to FIG. 24B, since the input image signals from the CCD 701 are non-interlaced signals, signals of a frame are sequentially written to the bank 0.

Meanwhile, the image signals are simultaneously read from the bank 1 in two different reading manner. One is a shuffling similarly to the reading operation explained with reference to FIG. 24A, and the other is interlace reading for obtaining the monitor signals. It is not necessary to read out signals by shuffling if no recording operation is to be performed, of course.

Note, both of the first write address generator 720 and the second read address generator 723 shown in FIG. 23 generate interlaced addresses, and they are not used simultaneously. Therefore, it is possible to omit either of the first write address generator 720 or the second read address generator 723 and use the remaining one for both writing and reading purposes.

Further, an internal configuration of the reproduction processing unit 708 is not shown, however, it should be noted that either one of a write address generator and a read address generator provided in the reproduction processing unit 708 can be omitted and the remaining one may serve for both writing and reading purposes, similarly to the recording processing unit 705. According to the aforesaid configuration, it is possible to monitor a still image while recording the still image simultaneously.

<Modification of the Fifth Embodiments>

Figure 25:
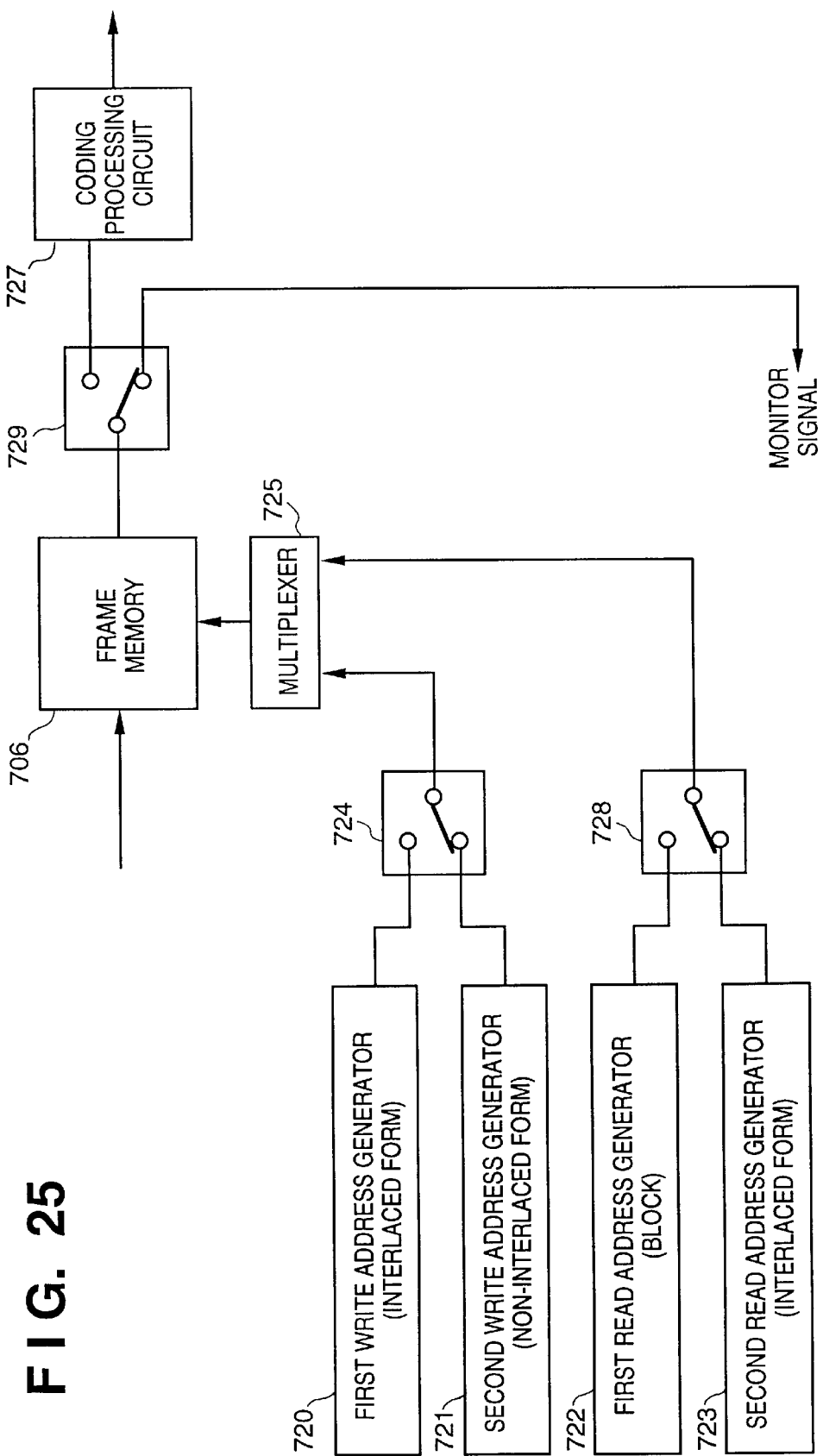
FIG. 25 is a block diagram illustrating a second internal configuration of a recording signal processing unit and a memory shown in FIG. 20.

FIG. 25 is a block diagram illustrating an internal configuration, different from the one shown in FIG. 23, of the recording signal processing unit 705 and the memory 706. In the configuration shown in FIG. 23, a data write system, a data read system and another data read system are required, thereby a memory of high access speed is required.

In the configuration shown in FIG. 25, a second switch 728 and a third switch 729 are provided and data is read out either for recording or for obtaining monitor signals, not for both as in the fifth embodiment.

By configuring as above, access rate to the frame memory 706 in the recording processing circuit 705 shown in FIG. 25 is kept constant. Other units and elements in FIG. 25 are the same as those shown in FIG. 23 and the explanation of those are omitted.

An operation on the frame memory 706 will be explained with reference to FIG. 26.

Figure 26:
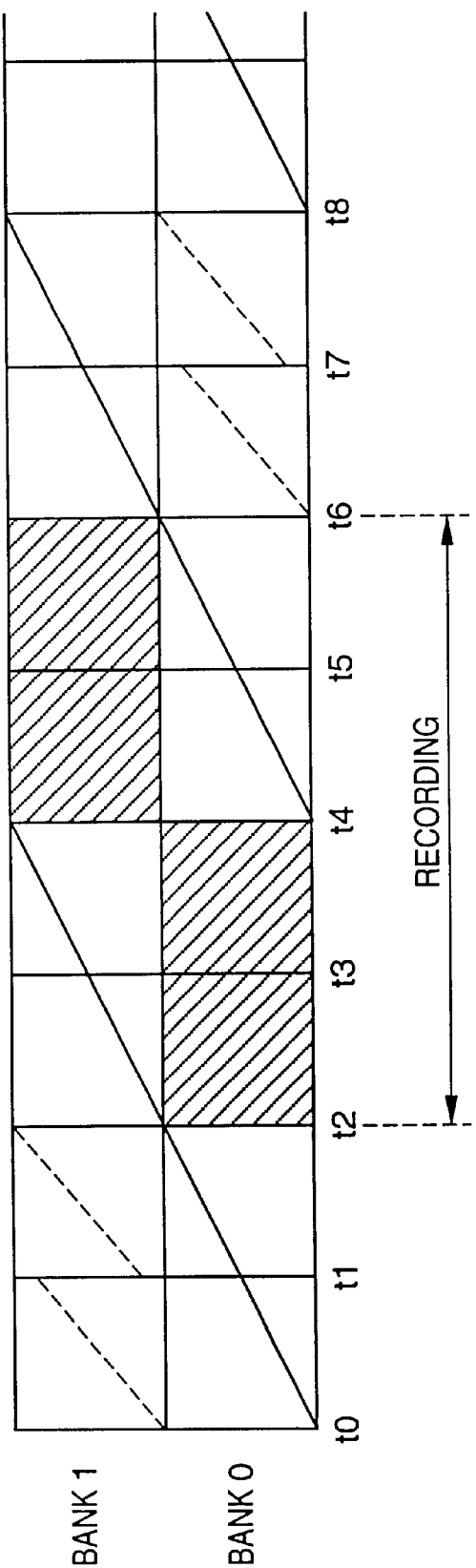
FIG. 26 is an explanatory view showing operation on the memory in the second internal configuration shown in FIG. 25.
Figure 27:
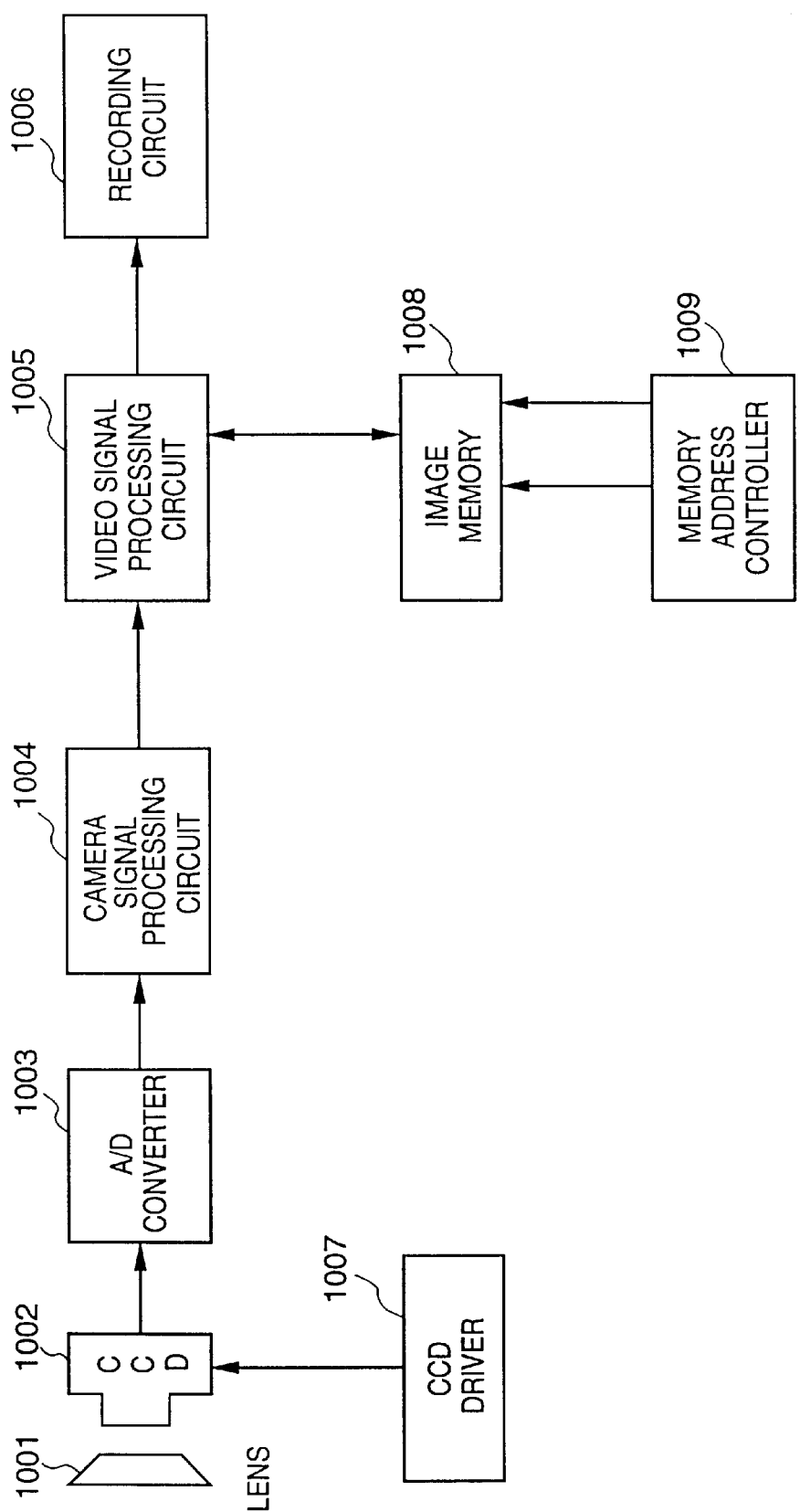
FIG. 27 is a block diagram illustrating a configuration of a conventional image sensing apparatus.

FIG. 26 shows an example when a recording operation is performed in a period between t2 and t6, and no monitor signal is obtained during recording. However, assuming that recording a still image is the main purpose, how an image inputted from the CCD 701 looks like can be confirmed by a monitor or an EVF just before recording the still image, i.e., until the time t2 in this embodiment. Therefore, this configuration is enough for using the image sensing apparatus in practice. Thus, by configuring the recording signal processing unit 705 as above, it is possible to record and monitor still images without using a memory of high access speed.

According to the fifth embodiment and its modification as described above, signals outputted from the image sensing unit by non-interlace scanning are sequentially written into a frame memory as well as the non-interlaced signals written in the frame memory are read out in interlaced form, thereby capable of outputting the read signals to an external device as television standard signals. Accordingly, it is possible to monitor image signals under recording or to be recorded on an electronic view finder or a general television by effectively using throughout image data of a frame outputted from the image sensing unit by non-interlace scanning. Therefore, it is possible to record a high quality still image without notches on edges and blurring even when a moving object is sensed or a camera is panned while sensing an image, as well as to print a high quality image directly provided from the image sensing apparatus without recording and reproducing the image.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    an image sensor for forming and sequentially outputting data of all of light receiving pixels in a field period as a plurality of scan lines;
    an interlaced output unit adapted to alternatively output in two different fields the scan lines to be supplied to an interlace viewer; and
    a non-interlaced output unit adapted to output all of the scan lines every other field period to be supplied to a printer or a computer.

2. The image sensing apparatus according to claim 1, wherein the image sensor comprises image sensing unit adapted to form data of all of light receiving pixel in a field period and sequentially output the data of all of the light receiving pixel as a multiple number of single horizontal scan lines, and wherein the interlaced output unit comprises first output unit adapted to alternatively output data of pixel in two different fields out of the data of all of the light receiving pixel outputted by said image sensing unit, and wherein the non-interlaced output unit comprises second output unit adapted to output the data of all of the light receiving pixels outputted by said image sensing unit in every other field period.

3. The image sensing apparatus according to claim 1, wherein the image sensor comprises image sensing unit adapted to sequentially output non-interlaced data of all of light receiving pixels in a field period as a multiple number of single horizontal scan lines, and wherein the interlaced output unit comprises first output unit adapted to add data of pixels outputted from said image sensing unit, on two horizontal adjacent lines whose combination in a field period is different from that in a previous field period and outputting the added data and wherein the non-interlaced output unit comprises second output unit adapted to output the non-interlaced data of all of the light receiving pixels outputted from said image sensing unit in every other field period, the image sensing apparatus further comprising a color filter provided in front of said image sensing unit.

4. The image sensing apparatus according to claim 1, wherein the image sensor comprises image sensing unit adapted to output non-interlaced data of all of light receiving pixels in a field period, and wherein the interlaced output unit comprises first output unit adapted to add data of pixels, outputted from said image sensing unit, on two horizontal adjacent lines whose combination in a field period is different from that in a previous field period and output the added data and wherein the non-interlaced output unit comprises second output unit adapted to output the non-interlaced data of all of the light receiving pixels outputted from said image sensing unit in every other field period and performing negative-positive inversion in which luminance levels and color levels of data of pixels are inverted, the image sensing apparatus further comprising a color filter provided in front of said image sensing unit.

5. The image sensing apparatus according to claim 2, wherein said image sensing unit sequentially outputs the data of all of the light receiving pixels as a multiple number of single horizontal scan lines.

6. The image sensing apparatus according to claim 2, wherein said image sensing unit outputs the data of all of the light receiving pixels as a multiple number of pairs of horizontal scan lines.

7. The image sensing apparatus according to claim 1, wherein the image sensor is a non-interlaced or progressive sensor.

8. The image sensing apparatus according to claim 7, wherein the image sensor is a CCD.

* * * * *

UNITED STATES PATENT AND TRADEMARK OFFICE
CERTIFICATE OF CORRECTION

PATENT NO. : 6,538,696 B2
DATED : March 25, 2003
INVENTOR(S) : Teruo Hieda et al.

It is certified that error appears in the above-identified patent and that said Letters Patent is hereby corrected as shown below:

Title page, Item [54] and Column 1, Lines 1-3,
Title, should read:
-- IMAGE SENSING APPARATUS USING A NON-INTERLACE OR PROGRESSIVE SCANNING TYPE SENSING DEVICE --

Title page,
Item [*] Notice, the following was omitted:
--      This patent issued on a continued prosecution application filed under 37 CFR 1.53(d), and is subject to the twenty year patent term provisions of 35 U.S.C. 154(a)(2). --
Item [56], References Cited, U.S. PATENT DOCUMENTS,
"5,475,525 A    12/1995       Przyborski et al." should read
-- 5,475,425 A    12/1995       Przyborski et al. --

Column 8,
Line 31, "show away" should read -- show a way --

Column 9,
Line 30, "HPF has" should read -- HPF 112 has --

Column 19,
Line 30, "method . Reference" should read -- method ②. Reference --
Line 45, "to Avoid wasteful processing of imag e signals." should read -- to avoid wasteful processing of image signals. --
Line 54, "line e to" should read -- line to --

UNITED STATES PATENT AND TRADEMARK OFFICE
CERTIFICATE OF CORRECTION

PATENT NO.    : 6,538,696 B2
DATED         : March 25, 2003
INVENTOR(S)   : Teruo Hieda et al.

It is certified that error appears in the above-identified patent and that said Letters Patent is hereby corrected as shown below:

<u>Column 26,</u>
Line 11, "<u>b</u>when" should read -- <u>b</u> when--

Signed and Sealed this

Eighth Day of June, 2004

JON W. DUDAS
*Acting Director of the United States Patent and Trademark Office*